(12) United States Patent
Becherer et al.

(10) Patent No.: US 6,591,668 B1
(45) Date of Patent: Jul. 15, 2003

(54) METHOD AND SYSTEM FOR ASCERTAINING THE EMERGENCY RUNNING CONDITION OF A PNEUMATIC TIRE

(75) Inventors: Thomas Becherer, Hannover (DE); Gerhard Ernst, Hannover (DE); Holger Oldenettel, Garbsen (DE); Andreas Köbe, Hannover (DE); Heinrich Huinink, Garbsen (DE); Helmut Fennel, Bad Soden (DE); Michael Latarnik, deceased, late of Friedrichsdorf (DE), by Christine Latarnik, Sylvia Monika Latarnik, legal representatives; by Eva-Maria Latarnik, legal representative, Darmstadt (DE)

(73) Assignees: Continental Aktiengesellschaft, Hannover (DE); Continental Teves AG & Co. oHG, Frankfurt a.M. (DE)

( * ) Notice: Subject to any disclaimer, the term of this patent is extended or adjusted under 35 U.S.C. 154(b) by 0 days.

(21) Appl. No.: 09/514,254

(22) Filed: Feb. 28, 2000

(30) Foreign Application Priority Data

Feb. 26, 1999 (DE) .......................................... 199 08 701

(51) Int. Cl.$^7$ ............................................. G01M 17/02

(52) U.S. Cl. ....................................... 73/146; 73/146.5

(58) Field of Search ................................ 73/146, 146.2, 73/146.3, 146.4, 146.5, 146.8; 340/441, 442, 443, 444, 445, 446, 447, 448

(56) References Cited

U.S. PATENT DOCUMENTS

| | | | | |
|---|---|---|---|---|
| 5,694,987 A | * | 12/1997 | Marchart | 141/38 |
| 5,913,241 A | * | 6/1999 | Ohashi et al. | 73/146.2 |
| 6,011,463 A | * | 1/2000 | Cormier, Sr. | 340/447 |

FOREIGN PATENT DOCUMENTS

| | | |
|---|---|---|
| DE | 2509939 | 9/1976 |
| DE | 2538948 | 3/1977 |
| DE | 69301827 | 4/1996 |
| EP | 630769 | 12/1994 |
| EP | 651702 | 3/1996 |
| EP | 700798 | 3/1996 |
| EP | 786362 | 7/1997 |
| EP | 787606 | 8/1997 |
| EP | 826525 | 3/1998 |

OTHER PUBLICATIONS

English Language Abstract of DE 25 39 948.
English Language Abstract of DE 25 09 939.
English Language Abstract of JP 9169203.
English Language Abstract of EP 630 769.

* cited by examiner

Primary Examiner—Hezron Williams
Assistant Examiner—Andre Allen
(74) Attorney, Agent, or Firm—Greenblum & Bernstein, P.L.C.

(57) ABSTRACT

System and method for ascertaining the emergency running condition of a pneumatic tire on a motor vehicle. The system includes at least one sensor device arranged at least on each axle. The at least one sensor device is adapted to supply a permanently present first periodic oscillation proportional to a wheel rotation speed as a speed output signal. The at least one sensor device includes one of an active and a passive magnetic field sensor being mounted to one of rotate with the tire and be stationary. The transmitter device is arranged complementary to the at least one passive and active magnetic field sensor and is adapted to produce a periodic magnetic field change in proportion to the wheel rotation speed in a detection range. At least one signal processing device is used for processing and evaluating the speed output signal. A transmission and a display device are used for at least one of the transmission and the display of the speed output signal, and for one of the transmission and the display of at least one of the output control and the warning signal. An emergency running device is arranged on the vehicle wheel.

61 Claims, 16 Drawing Sheets

METHOD AND SYSTEM FOR ASCERTAINING THE EMERGENCY RUNNING CONDITION OF A PNEUMATIC TIRE

CROSS-REFERENCE TO RELATED APPLICATIONS

The present application claims priority under 35 U.S.C. §119 of German Patent Application No. 199 08 701.6, filed on Feb. 26, 1999, the disclosure of which is expressly incorporated by reference herein in its entirety.

BACKGROUND OF THE INVENTION

1. Field of the Invention

The invention relates to a system and a method for ascertaining the emergency running condition of a pneumatic tire for motor vehicle wheels. A permanently present first periodic oscillation in proportion to the wheel rotation speed is produced at least on each axle, preferably on each wheel, and is fed to a signal processing device as a speed output signal. The speed output signal is supplied by active or passive magnetic field sensors, in that magnetically active or passive devices, preferably encoders, rotating relative to the sensors and situated on parts of the vehicle that rotate with the wheel or are stationary, produce a periodic magnetic field change in proportion to the wheel rotation speed.

2. Discussion of Background Information

The constantly rising safety requirements for motor vehicles increasingly demand the most comprehensive detection possible of all parameters that represent and influence the driving and moving condition of a motor vehicle, for use in intelligent systems for chassis and vehicle control and regulation. In particular, typical hazardous situations which can occur, for instance, when there is a sudden loss of pressure in a tire, must be reliably recognized and must activate appropriate warning or control signals.

A number of developments are approaching the safety requirement in other ways, in that, e.g., in the particularly critical case of a sudden loss of pressure in a tire, the potentially fatal effects are to be alleviated using devices on the vehicle wheel or in the tire construction that maintain a stable driving condition and capability for emergency running over a certain distance or time, even under pressure loss. Such developments are also supported by the fact that, because the weight of vehicles is being continually reduced for the sake of energy conservation, spare wheels and/or the necessary tools to mount them are no longer to be carried.

The term 'emergency running' or 'emergency running condition' is understood in this context to mean the driving condition in which, owing to a sudden loss of pressure in a tire, for instance, caused by external damage, the normal steering, adhesion or traction, and stabilizing properties of the tire as a connecting link or interface between the vehicle and the road are no longer present to the original extent, in which, however, a running ability and usability are nonetheless retained to an extent such that the safety of a vehicle is not unreliably limited. The emergency running condition then makes it possible to continue the journey for a certain distance without problems, preferably at least to the next service station.

The modern forms of such emergency running systems, which have already been under discussion for decades, e.g., emergency running support elements mounted on the rim, or sidewall-reinforced tires, combined with today's customary vehicle and suspension comfort, have the general disadvantage that an emergency running condition is no longer noticed by the driver as a result of the behavior of the vehicle being markedly different from the normal condition, so that there is a danger that the emergency running ability which, as a rule, is limited with respect to time or distance driven, is overtaxed and can finally result in the total failure of a tire or wheel, which then can again be extremely hazardous to the vehicle and its occupants.

In order to meet or address this potential danger, for example, a number of mechanical/acoustic warning devices have already been conceived that warn the driver by producing strong vibrations or noises.

DE 25 38 948 A1 discloses a vehicle wheel with a pneumatic tire having an emergency running ring inside a tubeless tire, which ring is provided on its surface supporting the tire in the emergency running condition, i.e., on its emergency running surface, with one or more projections arranged distributed over the circumference to warn the driver which, in the case of a sudden loss of pressure in the tire and the resulting deposit of the inside of the tread region on the emergency ring, is intended to cause vibrations that draw the attention of the driver to the loss of air.

DE 25 09 939 A1 also discloses an emergency running support element, in this case an emergency running tube which, in its outer region, has a hollow cylindrical element of metal or hard plastic and has concavities in the shape of a universal ball joint distributed over the circumference on its outer surface which, when the emergency running tube is activated, produce an audible noise that is intended to indicate a defect in the pneumatic tire.

JP 91 69 203 A discloses annular pieces of rubber arranged inside the tire and on the rim, which support the inside of the tread region of the tire during emergency running. The annular pieces or annular sections disclosed here do not support the tire over the entire circumference of its rolling radius, but only partial regions, which may be staggered by up to 180°. Here as well, when there is a loss of air, a vibration is to be produced that informs the driver of a loss of air in the form of an audible noise or by transmission to steering elements.

The disadvantage of such mechanical/acoustic warning devices is essentially that in today's customary excellent damping and decoupling between the chassis and the body-work in connection with a desired high level of suspension and driving comfort and good sound insulation of the interior of the vehicle, the resulting noises or vibrations are no longer reliably detected by the driver, or else would have to be so loud or severe that it would simply not be possible to continue driving.

Further development has therefore been concentrated on ascertaining an emergency running condition with measuring mechanisms and making the driver aware of it via optical and acoustic warning devices in the vehicle. Two basic methods are known essentially therefor, namely, on the one hand, direct measurement of the air pressure inside a tire and, on the other hand, the indirect determination of the air pressure of a tire, e.g., via a suspension behavior of the tire influenced by a change in air pressure or via a change in the rolling radius or the dynamic rolling circumference of a wheel caused by the change in air pressure, i.e., by a change in speed.

While it is true that a direct measurement of air pressure, for example, via aneroid boxes inside the tire, represents a reliable detection method, it results in a high expenditure on sensing, power supply, and transmission systems by which the changes in air pressure measured inside the rotating tire can be transmitted to the stationary sensors installed in the vehicle and thus to the processing electronics.

EP 630 769 A1 discloses a tire pressure detection device for truck tires in which a pressure sensor inserted inside a wheel bolt arranged in the rim, which is connected via hose lines to the tire valve, tests the air pressure in the tire and transmits these test results via rotating antennae, which are arranged adjacent to the wheel support and the axle, into the vehicle or to a processing unit.

The device conceived here for the large-scale mounting conditions of a truck tire requires a high expenditure on additional components that make the entire system more expensive, is extremely high-maintenance and susceptible to mechanical damage and soiling, makes it difficult to change the tire, and also, because it is necessary to arrange the system on all tires, represents a system that calls into question cost-effective production, even in series production and, in particular, for passenger automobile tires, owing to its high level of complexity for sensors, cabling, and other additional components.

On the other hand, pressure loss warning systems based on the detection of the dynamic rolling circumference, have a number of imponderabilities that lead to inaccurate measurements or decisions. Among other reasons, these imponderabilities arise because the dynamic rolling circumference can be strongly influenced not only by the pressure inside the tire, but also by stress conditions during the journey, temperatures, varying speeds, profile wear, the influence of the road surface, and various acceleration or braking conditions.

EP 826 525 A2 discloses a device for detecting a loss of air in a tire in which all four tires or wheels are provided with devices that transmit a pulse signal dependent on the wheel rotation speed to a computer that ascertains therefrom the rate of rotation of the four wheels or tires and compares them with one another in order to detect a drop in pressure.

EP 787 606 A2 discloses a method in which, after detection of the rotation or angle velocities of the four wheels, the corresponding values for diagonally opposite wheels are compared and, if a loss of pressure is detected, a warning signal is activated.

EP 786 362 A2 discloses a method in which the dynamic rolling circumference or quantities associated therewith, such as for instance the dynamic rolling radius of a tire, is likewise ascertained on all four wheels and in which the longitudinal and transverse acceleration is additionally tested in order to recognize misinterpretations caused thereby and to validate the pressure loss signal.

The disadvantages and difficulties associated with all these methods and devices in detecting and reliably reporting a pressure loss are clear if it is recalled that the changes in the dynamic rolling circumference can be severely influenced by a number of different parameters. Thus, the rolling circumference not only changes with the inflation pressure, but also changes noticeably because of a change in speed, a change in profile depth, the road surface, e.g., asphalt compared to concrete, and normal scattering of values in a series. Thus, the problem of measurement techniques to sense these different influence variables and their electronic processing to produce a reliable signal has not yet been solved satisfactorily and is decidedly difficult.

A farther great uncertainty in measurements for determining air pressure based only on the current rolling circumference arises because the influence of inflation pressure and speed on the rolling circumference for tires of various makes or differing construction is very different. Thus, e.g., the dependence on inflation pressure can be considerably greater in a tire with an obtuse belt angle than in a tire with an acute belt angle. Moreover, the difference in the rolling circumferences is altered by differing wear of the tires or by the tires being changed, to such an extent that the disclosed methods and devices with their upstream logic activate a warning although a hazardous situation does not exist. In order to avoid this, e.g., the wear of tires would have to be recognizable by separate methods and each respective tire construction would always have to be known.

The absolute value of the rolling circumference is therefore relatively unsuited for a warning. Also, the difference between the rolling circumferences of all tires on a vehicle does not lead to reliable information, since, e.g., different degrees of wear or the mounting of new tires cannot be recognized or else a slow loss of air pressure on two or more tires cannot be ascertained. To compensate for such imponderabilities, a new calibration would have to be performed constantly, also independently of the distance traveled, which would make the system more expensive and render the operation relatively unsafe, since a new calibration during the journey would naturally have to be performed by the driver of the vehicle.

Another method known in prior art for detecting emergency running includes detecting different oscillation or acceleration behavior of a wheel in comparison with normal running, which is caused by a tire rolling when it has lost its air, or by an emergency running surface being mounted and activated.

EP 0 651 702 discloses a method for detecting an emergency running condition in which accelerations or higher order resonance oscillations (above 100 Hz) characteristic of emergency running, which are caused by rolling on emergency running surfaces, are sensed by corresponding acceleration sensors on bodywork or chassis suspensions.

EP 700 798 A1 shows a method in which velocity or speed signals are processed by measuring the rolling circumference, and vibrations occurring during emergency running are detected that result from the said different behavior of a tire in the emergency running condition compared with the normal condition.

These methods or devices also have the disadvantage that there is no typical vibration or oscillation behavior in emergency running and it is therefore difficult to determine and detect since, even in emergency running, the different tire construction, nature of the road surface, speed, and various acceleration or braking procedures cause such a strong superimposition or influence that it is scarcely possible to differentiate clearly between disturbances and emergency running.

SUMMARY OF THE INVENTION

The invention therefore provides a system and a method for ascertaining the emergency running condition of a pneumatic tire that allows reliable detection of the emergency running condition in all driving circumstances, that tolerates all disturbances and influence variables that occur, that can be used equally with all tire and vehicle sizes and for all tire constructions, that makes measurements detectable reliably and in the simplest manner, without high-cost design or measurement technology, and that additionally can be used in a cost-effective manner and is available for series production.

According to one aspect of the invention, there is provided, in the emergency running condition, one or more separately defined periodic oscillations that are characteristic of the emergency running condition and in proportion to the wheel rotation speed, which are superimposed on the first oscillation or the speed output signal, and in which the signal processing device detects a superimposition of the first periodic oscillation with the separately defined periodic oscillation(s) characteristic of the emergency running condition, and processes it to produce a warning signal.

By superimposing on the first periodic oscillation one or more separately defined periodic oscillations that are characteristic of the emergency running condition and in proportion to the wheel rotation speed, a characteristic specific to emergency running is created exclusively that yields a clearly recognizable signal, independently of influence variables such as speed, wheel load, tire wear, road surface, etc. When such a signal occurs, therefore, there is no doubt that an emergency running condition is present, without further testing of the driving condition needing to take place. In many cases, the superimposition of the speed output signal with only one second periodic oscillation characteristic of emergency running condition and in proportion to the wheel rotation speed, is adequate for reliable recognition.

It is advantageous here for the speed output signal to be supplied in the form of a permanently present first periodic oscillation that is in proportion to the wheel rotation speed by utilizing active or passive magnetic field sensors, preferably encoders, with magnetically active or passive devices that rotate relative to the sensors and are situated on parts of the vehicle that rotate with the wheel or are stationary, producing a periodic magnetic field change in proportion to the wheel rotation speed.

Through such a design, simple and conventionally available and tested sensors and signal generators can be used, so that the expenditure on apparatus is reduced and cost-effective production of the associated device parts is made possible.

In a preferred embodiment, the separately defined periodic oscillations that are characteristic of the emergency running condition and in proportion to the wheel rotation speed, are produced by an emergency running device provided on the vehicle wheel for continuing the journey when the tires are in a damaged state or have lost their air.

The production of the second or even further oscillations by such an emergency running device which is designed, as a rule, in the form of one or more support elements in or on the wheel or tires or in the form of reinforcements in the body of the tire, allows a very simple and very cost-effective solution, as far as the necessary means are concerned, for producing one or more separately defined periodic oscillations that are characteristic of the emergency running condition and clearly recognizable.

In a further advantageous embodiment, the separately defined periodic oscillations that are characteristic of the emergency running condition and in proportion to the wheel rotation speed are produced by an emergency running support element, that is arranged inside the pneumatic tire on its rim, and provided on its rolling circumference with discontinuities, preferably designed as cavities or concavities.

This further simplifies the production of the second or further oscillations defined for the emergency running, where the type of oscillations can also be developed in any manner desired and matched to the vehicle in order to produce a distinct signal difference. Thus, the size and number of the discontinuities arranged as concavities or projections on the rolling circumference can be arranged so that, in the emergency running condition, one or more signal oscillations clearly different from the customary oscillations caused by driving conditions is produced and changes the speed output signal in a clearly recognizable manner.

A likewise simplified and advantageous production of the second or further oscillations defined for the emergency running is enabled in that the periodic oscillations that are characteristic of the emergency running condition and in proportion to the wheel rotation speed are produced with one or more material reinforcements formed inside the tire body, preferably in the sidewall region. These material reinforcements are optionally constructed from various layers and/or plies of strength supports and stabilize the tire in emergency running when it loses air, and have defined discontinuities distributed over their circumference and are preferably formed as agglomerations of material or material voids. Thus additional emergency running support elements become unnecessary, although with the slight disadvantage that the tires as such are heavier, so that the choice of embodiment to be used must be tailored to the individual case.

Further advantageous embodiments provide that the periodic oscillations that are characteristic of the emergency running condition and in proportion to the wheel rotation speed are produced by a first number of discontinuities distributed uniformly over the circumference, or by a first number and a second number, different from the first number, of discontinuities distributed uniformly over the circumference.

This produces a harmonic oscillation typical of the emergency running condition which, as a superimposed oscillation, changes the speed output signal fed to the signal processing device in a distinct manner.

Such a harmonic oscillation, formed, for example, as a 13th-order harmonic oscillation of the tire period, which is produced by 13 concavities distributed uniformly over the circumference of the tread, is found to be unusual and thus clearly detectable compared with the usually active disturbances and oscillation changes. The clear recognition can be still further facilitated in that the formation of a first number of cavities or concavities distributed uniformly over the circumference and a second number of cavities, different from the first number, distributed uniformly over the circumference produces two different-order harmonic oscillations of the tire period. The joint occurrence of these two different order harmonic oscillations in the superimposition of the speed output signal represents a completely reliable indication of the presence of the emergency running condition.

Furthermore, the same effect is also achieved in that the periodic oscillations that are characteristic of the emergency running condition and in proportion to the wheel rotation speed are produced by a number of discontinuities distributed non-uniformly over the circumference.

In a further advantageous embodiment, the speed output signal, after being processed in the signal processing device, is compared with one or more reference and/or threshold values. As a result of this comparison, the superimposition with the separate periodic oscillations characteristic of the emergency running condition is detected based on the reference and/or threshold values being exceeded, and is processed to produce a warning signal.

Such a comparison, which is known per se, with reference and/or threshold values increases the reliability of the information in detecting an emergency running signal and makes it possible to further eliminate the influence of disturbances.

Here, it is advantageous for the speed output signal of a wheel or an axle, after being processed in the signal processing device, to be compared with speed output signals of the other wheels or axles as reference values. For one thing, this leads to the locating of the wheel that is in the emergency running condition and furthermore excludes the possibility that disturbances affecting all the wheels simultaneously, in particular during a brief occurrence, will lead to activation of the emergency running warning signal. The comparison can then be carried out with wheels on one side of the vehicle, one vehicle axle, or else in the form of a comparison with diagonally opposite wheels.

In a further advantageous embodiment, the wheel velocity is calculated in the signal processing device for stipulated time intervals from the speed output signal and is compared with one or more reference wheel velocities and/or threshold values, in which, starting from the oscillation representing the speed output signal in the signal processing device, for several successive and defined wheel rotation angles, the corresponding times for the partial rotations of the wheel determined by the defined wheel rotation angles are ascertained and stored. Within defined count times $T_L$ containing several successive wheel rotation angles, an average wheel rotation velocity is calculated for one or more wheel rotations within the count times from the times ascertained for the partial rotations and their number and is stored. The averaged wheel rotation velocities or their course are then compared with reference and/or threshold values, and when the reference and/or threshold values are exceeded, a warning signal is activated.

Here, the basis for determining or processing the corresponding times for the partial rotations of the wheel determined by the defined wheel rotation angles is called a "time window," namely a defined count time or measuring time $T_L$, also called "loop time."

Such a determination of the wheel velocity involves merely a relatively simple processing of the speed output signal and, thus, reduces the expenditure on electronic processing devices or computer capacity and the costs for the corresponding electronics. However, with such a processing method of the speed output signal, it must be taken into consideration that, in evaluating the number of single pulses obtained within a defined count time $T_L$, bodywork or structural oscillations or resonances can influence and change the evaluation result, without necessarily making it considerably less informative. Therefore, a balance must be struck between the simplest possible evaluation and the most accurate evaluation result.

By superimposing the speed output signal with one or more separately defined oscillations characteristic of the emergency running condition as provided in the invention, it is in fact possible to carry out such a simplified examination and evaluation directed towards the absolute value of the sensed velocity, without having to detect other signals representing the driving condition, for example, momentary longitudinal or transverse acceleration values and velocities. Their detection by appropriate sensors in fact requires more complex design and their electronic processing leads to a considerably more complicated structure in the electronics, which thus becomes unnecessary.

The superimposed separate additional oscillations characteristic of the emergency running condition are represented as velocity oscillations in such a method, i.e., as periodic changes in velocity within a rotation of the wheel, which are produced, for example, by concavities or discontinuities applied to an emergency running support element and the resulting rolling radius changed in differentially small sections of time. These oscillations cause a distinctly noticeable change in the number of counting pulses ascertained from the binary signal within the time interval $T_L$ (loop time).

A further advantageous embodiment provides that, starting from the oscillation representing the speed output signal in the signal processing device, for several successive and defined wheel rotation angles, the corresponding times for the partial rotations of the wheel determined by the defined wheel rotation angles are ascertained and stored. An average is then calculated from several such successively ascertained times for one or more wheel rotations and is stored. Subsequently deviations of the times for partial rotations of the wheel from the average value calculated are ascertained. The ascertained deviations are compared with reference and/or threshold values, and when the reference and/or threshold values are exceeded, a warning signal is activated.

In this case, the basis for determining or processing the corresponding times for the partial rotations of the wheel determined by the defined wheel rotation angles is not, for instance, a "time window," but the partial rotation of the wheel as such, i.e., the examination of a defined wheel rotation angle or an "angle window."

Using a conventional sensor, which can contain, e.g., toothed magnet wheels or similar elements as encoders, the speed output signal can first be converted into a single-pulse signal or into a square wave signal, as a rule. Here, this takes place such that the edges of the square wave signal are correlated with the transit signals of the magnetic field sensors representing the speed output signal, which are produced by the individual teeth of a toothed magnet wheel, such that a square wave oscillation of the square wave signal represents, for example, a wheel rotation angle defined by the transit of a tooth of the magnet wheel.

In the time measurement devices (timers) usual for measuring short times, which customarily require digital input signals for the processing, the times for the partial rotations of the wheel determined by the defined wheel rotation angles can be measured, e.g., by determining the edge interval, i.e., the time differences between the edges of the square wave signal. It is advisable in such an evaluation of a square wave oscillation to observe the edge interval or the time difference between the zero values of the edges of the square wave signal, i.e., always at a representative and equal point of the signal.

Of course, any other suitably supplied oscillation can be used instead of a square wave signal to ascertain the corresponding times for partial rotations of the wheel.

The times for partial rotations of the wheel are therefore measured directly via the time differences between the zero values (zero value times), i.e., the time intervals $\Delta T_{0(i)}$ (t) between the edges of a square wave oscillation, where $\Delta T_0$ represents the zero value time respectively for the determinations/measurements i, i+1, i+2, etc.

As far as the averaging described above is concerned, in addition to the averaging of several successively ascertained or calculated values of one wheel rotation, a particularly suitable type of evaluation includes in that the individual times ascertained for the partial rotations of the wheel determined by the defined wheel rotation angles first undergo a rotation-synchronous averaging before further processing, i.e., over several wheel rotations an average value is found for several wheel rotations using the times measured at equal time intervals or in equal rotation angle intervals with respect to one wheel rotation, which average value is then the basis for further signal processing.

In such a rotation-synchronous averaging, the signals sensed on the wheel and already present as "time values"

after a processing, which signals are sensed with respect to one wheel rotation in equal time intervals or in equal rotation angle intervals, i.e., therefore the signals that are produced for instance by the same teeth of a magnet wheel or encoder in the course of a single wheel rotation, are therefore averaged over several wheel rotations. This allows the influence of signal noise or briefly active disturbances, such as any unevenness in the roadway, to be further reduced and the informativeness of the signal to be reinforced, since the then conspicuous times for the partial rotations with a separately defined oscillation of the wheel characteristic of the emergency running condition are distinctly different from the influences on the times produced as a rule by other disturbances.

Such averaging is likewise suitable both for the evaluation based on the defined count times (loop time) and for other values obtained by processing the speed output signal, for example, for the frequencies, the wheel velocities, etc., as described below.

Overall, the invention, on the one hand enables an extremely precise evaluation result and one that is almost completely uninfluenced by structural and bodywork oscillations, and on the other hand an initial or intermediate quantity is available with the ascertaining of the times for the partial rotations of the wheel determined by the defined wheel rotation angles, or with the ascertaining of the zero value times, which quantity can be further processed by further simple calculation steps with the knowledge of the geometric functions on the wheel or tires to give information about the momentary wheel velocity or the wheel acceleration, or else can undergo a pattern recognition or frequency evaluation, as described below.

A further advantageous embodiment provides that, starting from the oscillation representing the speed output signal in the signal processing device, for several successive and defined wheel rotation angles, the corresponding times for the partial rotations of the wheel determined by the defined wheel rotation angles are ascertained and stored. A pattern of the several successive times is ascertained with the aid of a pattern recognition process. The ascertained pattern is then compared with the reference pattern and/or threshold values, and when there are deviations from the reference pattern and/or threshold values, a warning signal is activated.

Such an embodiment, which works with the aid of pattern recognition, allows a very simple and reliable recognition of the geometric assignment of changes in the ascertained zero value times relative to the wheel position angle/wheel rotation angle in the circumferential direction. The changes in the ascertained zero value times are produced by the rolling of the wheel that takes place during emergency running, on the emergency running support element provided with discontinuities in the described manner. When sensor devices are used that contain toothed magnet wheels or similar elements as encoders, the zero value times can then be represented as time differences between the zero values, e.g., very simply as a function of the number of edges of the respective teeth.

In a further advantageous embodiment, it is provided for frequency evaluation that starting from the oscillation representing the speed output signal in the signal processing device, for several successive and defined wheel rotation angles, the corresponding times for the partial rotations of the wheel determined by the defined wheel rotation angles are ascertained and stored. With the aid of one or more computer units, the frequencies of the times are calculated by taking the reciprocal and then stored. Subsequently, an average of the ascertained frequencies is calculated for one or more wheel rotations and stored. The deviations of the ascertained frequencies from the average value are ascertained. The ascertained deviations are then compared with reference and/or threshold values, and when the reference and/or threshold values are exceeded, a warning signal is activated.

Here, the frequencies are calculated by taking the reciprocal, for example, according to the formula $f_{(i)}(t) = 0.5/\Delta T_{0(i)}(t)$, where f represents the ascertained frequency and $\Delta T_{0(i)}(t)$ the zero value time respectively for the determinations/measurements i, i+1, i+2, etc. The factor 0.5 results in this case from the respective 2 measured zero value times in an oscillation period of the sine-shaped speed output signal of a wheel.

When ascertaining the average of the frequencies, in addition to the averaging of several successively ascertained or calculated values of a wheel rotation, a rotation-synchronous averaging is provided in which the signals sensed on the wheel and already present as "frequency values" after a processing, which signals are sensed with respect to a wheel rotation are sensed at equal rotation angle intervals, are averaged over several wheel rotations. As already shown, this allows the influence of signal noise or briefly active disturbances, such as any unevenness in the roadway, to be further reduced and the informativeness of the signal to be reinforced, since the then conspicuous frequency of the separately defined oscillation characteristic of the emergency running condition, formed, for example, as an nth-order harmonic oscillation of the tire period, is distinctly different from the influences produced by other disturbances, as a rule.

An alternative advantageous embodiment of the process with respect to the evaluation of frequencies includes in that, starting from the oscillation representing the speed output signal in the signal processing device, for several successive and defined wheel rotation angles, the corresponding times for the partial rotations of the wheel determined by the defined wheel rotation angles are ascertained and stored. With the aid of one or more computer units, the frequency spectrum of the times for the partial rotations of the wheel undergoes a frequency analysis to ascertain the power spectral density or densities. Subsequently, with the aid of one or more computer units, the ascertained power spectral densities are integrated over certain selected frequency intervals and then stored. The integral of the selected frequency intervals is then compared with a reference or threshold value, and when the reference or threshold values are exceeded, a warning signal is activated.

Such a frequency analysis can be carried out, for example, in the form of a Fourier analysis, which can be done both by a computer unit and also, in an analogous manner, by utilizing a circuit arrangement.

Such evaluations or methods can be carried out alone or in addition to an evaluation of the standard deviations of the zero value times. The evaluations of the frequency analysis and the subsequent integration over selected frequency intervals offer the advantage that the information reliability can be further increased thereby, since the then conspicuous order of the frequency of the separately defined oscillation characteristic of the emergency running condition, formed, for example, as an nth-order harmonic oscillation of the tire period, can be determined in a simple manner, since they are even more distinctly different from the influences produced by other disturbances, as a rule.

A further and, in this sense, advantageous development of the method that makes the evaluation result clear includes in that, starting from the oscillation representing the speed output signal in the signal processing device, for several successive and defined wheel rotation angles, the corresponding times for the partial rotations of the wheel determined by the defined wheel rotation angles are ascertained and stored. With the aid of one or more computer units, the momentary wheel velocities are calculated from the times for the partial rotations of the wheel ascertained and stored and are then stored. Subsequently, an average of the calculated momentary wheel velocities is calculated for one or more wheel rotations and stored. The deviations of the calculated momentary wheel velocities are ascertained from the calculated average value. The ascertained deviations are then compared with reference and/or threshold values and when the reference and/or threshold values are exceeded, a warning signal is activated.

Here, the wheel velocities are calculated, for example, according to the formula $v_{(i)}(t)=0.02 \text{ m}/\Delta T_{0(i)}(t)$, where v represents the wheel velocity and $\Delta T_0$ the zero value time for the determinations/measurements i, i+1, i+2, etc. The rolling circumference of the wheel/tire during the zero value time is 0.02 m in this case. Such an evaluation of the wheel velocities differs with respect to the determination method from that already mentioned and with respect to the evaluation of the times for the partial rotations of the wheel within a "loop time," since here the partial rotation of the wheel as such, i.e., therefore the observation of a defined wheel rotation angle, is the basis for the determination or for the processing of the corresponding times for the partial rotations determined by the defined wheel rotation angles.

Likewise, in another advantageous embodiment, the evaluation result is made clear in that, starting from the oscillation representing the speed output signal in the signal processing device, for several successive and defined wheel rotation angles, the corresponding times for the partial rotations of the wheel determined by the defined wheel rotation angles are ascertained and stored. With the aid of one or more computer units, the momentary wheel accelerations are calculated from the times for partial rotation of the wheel, and are then stored. Subsequently, an average of the calculated wheel accelerations is calculated for one or more wheel rotations and stored. The deviations of the calculated momentary wheel accelerations are ascertained from the calculated average value or from a zero value. The ascertained deviations are compared with reference and/or threshold values, and when the reference and/or threshold values are exceeded, a warning signal is activated.

Here, the wheel accelerations are calculated, for example, according to the formula $a_{(i)}(t)=[v_{(i)}-v_{(i-1)}]/\Delta T_{0(i)}(t)$, where a is the wheel acceleration, v is the wheel velocity, and $\Delta T_0$ represents the zero value time for the determinations/measurements i–1, i, i+1, i+2, etc.

In these embodiments, velocity analysis and/or acceleration analysis can be carried out alone or in addition to an evaluation of the standard deviations of the zero value times or the frequencies/frequency analysis, such that every other or additional evaluation based on the initial or intermediate quantity "zero value times" offers advantages with respect to increased information reliability. Thus, for example, when the wheels are rolling on a very uneven, possibly strongly rutted surface or one with undulations or depressions in the ground, the speed output signals are checked using the various evaluation methods based on several threshold values, according to which the occurrence of an oscillation characteristic of emergency running can be distinguished from any disturbances with a high level of reliability.

Moreover, when sensor devices are used that contain toothed magnet wheels or similar elements as encoders, all evaluation methods are also designed so that incorrect interpretations of the signal owing for instance to partition defects in the toothing or other tolerances in the mechanical elements or the electronic components are avoided in that the processing of the signals contains a "learning" and self-calibration of the entire system. This can take place, e.g., in that in the normal condition, i.e., during travel without emergency running, regularly occurring deviations are recognized and their signal portion is subtracted from the ascertained base signal.

A system which is particularly suitable for carrying out the method for ascertaining the emergency running condition of a pneumatic tire for vehicle wheels, would include sensor devices arranged at least on each axle, preferably on each wheel, that supply a permanently present first periodic oscillation in proportion to the wheel rotation speed, as a speed output signal. The sensor devices would contain active or passive magnetic field sensors arranged on parts of the vehicle that rotate with the wheel or are stationary. These may contain magnetically active or passive transmitter devices that rotate at the wheel rotation speed relative to the magnetic field sensors and are arranged complementary to the sensors on parts of the vehicle that rotate with the wheel or are stationary, and that produce a periodic magnetic field change in proportion to the wheel rotation speed in the detection range of the magnetic field sensors. Moreover the system furthermore would have a signal processing device for processing and evaluating the speed output signals as well as for the output of control and/or warning signals. Transmission and display devices for the transmission and/or display of the speed output signals as well as the control and/or warning signals are utilized. The system would also have an emergency running device arranged on the vehicle wheel which, in the emergency running condition, produces one or more separately defined periodic oscillations that are characteristic of the emergency running condition in proportion to the wheel rotation speed and superimposes them on the first oscillation or the speed output signal. The signal processing device optionally has filtering devices for noise filtering, one or more storage devices for storing reference and/or threshold values, and also a comparator which, after processing, compares the speed output signals of the axles or wheels with one or more reference and/or threshold values and detects a superimposition of the first periodic oscillation with the separate periodic oscillations characteristic of the emergency running condition when the reference and/or threshold values are exceeded, and processes them to produce a warning signal.

Such a device, which produces one or more separately defined oscillations characteristic of the emergency running condition and superimposes them on the speed output signal, allows reliable detection of the emergency running condition with relatively simple apparatus and prevents a warning signal from being activated by the disturbances and influence variables resulting from the present driving condition.

The embodiment of such a system in utilizing the devices proven in prior art first provides that the sensor device for supplying a permanently present first periodic oscillation in proportion to the wheel rotation speed contains active or passive magnetic field sensors are arranged on parts of the vehicle that rotate with the wheel or are stationary, with the sensor devices also containing magnetically active or passive transmitter devices that rotate at the wheel rotation speed relative to the magnetic field sensors and are arranged complementary to these on parts of the vehicle that rotate with the wheel or are stationary with the transmitter devices producing a periodic magnetic field change in proportion to the wheel rotation speed in the detection range of the magnetic field sensors.

The design of the system becomes simplified by such a sensor device that is known per se inside the device of the invention, while a reliable and stable speed output signal is simultaneously retrievable in the form of a first periodic oscillation.

As a rule, these transmitter devices are constructed in the form of an annular or disk-shaped encoder that rotates with the wheel and has a number of permanent-magnetic areas distributed uniformly over the entire circumference of the encoder in the direction of rotation, with the magnetic field sensors being designed as active or passive measuring elements and being arranged stationarily on stationary parts of the vehicle and on the periphery of the encoder.

Such a system design in which the transmitter devices are constructed as encoders, i.e., as a magnet wheel rotating with the wheel or a toothed metallic wheel on its circumference and the magnetic field sensors are arranged stationarily on stationary parts, allows the use of already tested and known mechanisms and involves a further reduction in expenditure on the apparatus, since complicated signal transmission between rotating parts is not required.

A further embodiment of the system in which additional devices, such as encoders or magnet wheels, are omitted and thus, among other things, a saving of weight and a less complex sensing can be achieved, provides that the transmitter devices are designed as a number of permanent-magnetic areas arranged in the tire, preferably in the tire sidewall, and distributed uniformly over the entire circumference of the tire in the direction of rotation, and that the magnetic field sensors are arranged stationarily on stationary parts of the vehicle and on the periphery of the tire.

In general, it should be taken into consideration with all sensor devices that, in comparison with active measuring elements, passive measuring elements, which are frequently simpler to realize as far as their circuitry and their design or connections are concerned, produce a signal whose amplitude, i.e., strength, is dependent on the excitation frequencies, so that, in the present application, the amplitude of the signal of passive measuring elements is greater at high vehicle speeds and can decrease at slow vehicle speeds, which optionally requires an additional matching of the evaluation electronics and/or the threshold values used for the evaluation.

It is advantageous to design the system so that the emergency running device for producing one or more periodic oscillations that are characteristic of the emergency running condition and in proportion to the wheel rotation speed is designed as at least one emergency running support element arranged inside the tire and preferably supported on the rim, which support element has on its emergency running surface defined discontinuities distributed over the circumference.

Such a design of the device allows periodic oscillations to be produced in a mechanically simple manner that occur exclusively in the emergency running condition and are representative of this condition, such that the separate definition of the oscillations can easily be ensured and carried out via the shaping of the emergency running support element(s).

Advantageously, the defined discontinuities distributed over the circumference therefor are designed as cavities or concavities in the emergency running surface. Such a design proves to be particularly simple to manufacture, since the emergency running surface of an emergency running support element can be placed in an appropriate mold in an economical manner, for example, with customary milling, punching, or stamping devices. Furthermore, such a design of discontinuities of the tires in the emergency running condition, i.e., when at least parts of the inside of the tire tread lie on the emergency running support element, does not stress the tire unduly and damage to the tire material is avoided as far as possible.

In an advantageous embodiment of the device, the discontinuities are designed as a first number of cavities or concavities in the emergency running surface distributed uniformly over the circumference.

This produces a harmonic oscillation typical of emergency running that is formed owing to the reduced rolling radius inside a concavity or owing to the angle velocity/wheel rotation speed that is briefly changed thereby, while the road speed remains approximately constant. This superimposed oscillation changes the speed output signal fed to the signal processing device in a distinct manner.

Such a harmonic oscillation, formed, for example, as a 13th-order harmonic oscillation of the tire period, which is produced by 13 concavities distributed uniformly over the circumference of the tread, proves in fact to be unusual and thus clearly detectable compared with the usually active disturbances and oscillation changes.

In a particularly advantageous manner, the detectability and thus the reliability of the information that an emergency running condition is present, is reinforced in that a first number of cavities or concavities distributed uniformly over the circumference and a second number, different from the first number, of cavities or concavities distributed uniformly over the circumference, is formed in the emergency running surface.

Such an embodiment of the cavity arrangement produces two different-order harmonic oscillations of the tire period, whose joint occurrence in the superimposition of the speed output signal represents a completely reliable indication of the presence of the emergency running condition and, in addition to their good detectability, they offer in particular advantages in the evaluation using a frequency analysis, during the evaluation of the changes in the wheel velocity.

A further advantageous embodiment of the system provides that the emergency running device for the production of one or more periodic oscillations that are characteristic of the emergency running condition and in proportion to the wheel rotation speed includes one or more material reinforcements formed inside the tire body, preferably in the sidewall region, which reinforcements are optionally constructed from various layers and/or plies of strength supports and stabilize the tire in emergency running when it loses air, with the material reinforcements having defined discontinuities distributed over their circumference.

This makes it possible to obtain a defined emergency running signal even when no separate emergency running support elements are provided inside the tire, but nevertheless the tire is designed so that its shape remains stable in the emergency running condition, with the result that a limited continuation of the journey is possible and simultaneously a reliable signal is detectable for the recognition of this condition.

Advantageously, the defined discontinuities distributed over the circumference are formed as material agglomerations or material voids, which, in a similar manner to concavities on an emergency running support element, are arranged in the form of a first number of discontinuities distributed uniformly over the circumference, with a second number of discontinuities different from the first number being optionally distributed uniformly over the circumference.

Whereas, under normal air pressure, the material reinforcements formed inside the tire body are not stressed and, owing to correspondingly symmetrical arrangements, do not cause any imbalance or any impairment of the driving condition in normal operation, in the emergency running condition, i.e., with decreasing air pressure and thus the occurrence of stress of the corresponding regions in the tire body, such material agglomerations or material voids allow one or more readily detectable oscillations to arise, which can be clearly evaluated by the evaluation electronics in the signal processing device.

The disadvantage that arises, that the tire itself becomes heavier owing to a corresponding design of regions of the tire body, is partly compensated for by the fact that it is no longer necessary to insert an emergency running support element, as well as by the further advantage that even a slow loss of air can be detected by the gradual occurrence of an oscillation induced by material agglomerations or material voids, and that the signal does not occur only when there is a complete loss of air and the tire lies on support elements or support bodies.

The oscillation typical of emergency running is evaluated or detected in that, after the respective speed output signals of the axles or wheels have been processed in the signal processing device, the comparator compares the speed output signal of a wheel or an axle with stipulated reference values or speed output signals of the other wheels or axles as reference values and, when a stipulated difference between the speed output signals is exceeded, produces a warning signal.

As already described, a refinement and increase in the accuracy of the information is achieved by the latter processing, i.e., by a comparison of the speed of one wheel with the other wheels of one side of the vehicle or else with the wheels of the other side of the vehicle directly across or diagonally.

An evaluation that is particularly simple and can be carried out in a simpler manner as far as the processing of the signals is concerned, and can be achieved in a particularly advantageous manner by a system in which, starting from the signal inputs for the speed output signals of the individual wheels or axles. The signal processing device has, (a) one or more filters (35–38) for the speed output signals of the individual wheels or axles, preferably low-pass filters, for filtering the speed output signals from high-frequency noise portions. (b) Including one or more comparator circuits, in particular Schmitt triggers (39–42) producing square wave signals, for the speed output signals of the individual wheels or axles, for converting the speed output signals into single-pulse signals. (c) Including one or more time control devices (43–46) (timers) that, for several successive and defined wheel rotation angles, measure the corresponding times for the partial rotations of the wheel determined by the defined wheel rotation angles, with the times being measured by ascertaining the time differences between two decreasing or increasing edges of the square wave signal that correlate with the times for the partial rotations. (d) Including one or more counting devices (43'–46') connected in parallel to the time control devices for the individual single-pulse signals for ascertaining the number of single pulses obtained or the measured times within a defined count time $T_L$. (e) Including one or more storage devices (47) for storing the times ascertained according to (c) and the number of single pulses obtained according to (d) within several successive count times $T_L$. (f) Including a computer circuit (48) for calculating the average wheel rotation speeds within the count times $T_L$ for one or more wheel rotations from the times ascertained for the partial rotations and their numbers within the count times $T_L$, and storing them, and (g) a comparator (49) that compares the averaged wheel rotation velocities or their course with reference and/or threshold values and, when the reference and/or threshold values are exceeded, activates a warning signal.

In such a simple embodiment of the system, the wheel velocities are compared directly with reference values or with one another which, in the majority of the applications, particularly also as far as a wide application in series vehicles is concerned, is sufficient to define the emergency running condition. Furthermore, standard electronic devices can be used for the device, such as, e.g., comparator circuits, which are usually known as operational amplifiers without negative feedback, so that such standard devices allow the device to be produced economically in series production as far as the manufacturing cost and the complex circuitry and connection of electronic components are concerned.

A further advantageous embodiment of the system provides that, starting from the signal inputs for the speed output signals of the individual wheels or axles, the signal processing device has, (a) one or more filters (35–38) for the speed output signals of the individual wheels or axles, preferably low-pass filters, for filtering the speed output signals from high-frequency noise portions. (b) Including one or more comparator circuits, in particular Schmitt triggers (39–42) producing square wave signals, for the speed output signals of the individual wheels or axles, for converting the speed output signals into single-pulse signals. (c) Including one or more time control devices (50–53) (timers) that, for several successive and defined wheel rotation angles, measure the corresponding times for the partial rotations of the wheel determined by the defined wheel rotation angles, with the times being measured by ascertaining the time differences between two decreasing or increasing edges of the square wave signal that correlate with the times for the partial rotations. (d) Including one or more storage devices (54) for storing the times of several successive time measurements carried out according to (c). (e) Including a computer circuit (55) for calculating an average value from several such successively ascertained times for one or more wheel rotations and for calculating the deviations of the times ascertained and stored according to (c) from the calculated average value, and (f) a comparator (56) that compares the ascertained deviations with reference and/or threshold values and, when the reference and/or threshold values are exceeded, activates a warning signal.

As already explained in the description of the associated method, the time differences, i.e., the time intervals between the zero values (zero value times) are measured directly in this instance, making it possible to obtain an extremely precise evaluation result that is almost completely uninfluenced by structural and bodywork oscillations.

In a further advantageous embodiment, the signal processing device contains further devices, for instance, computing devices or suitable electronic circuits, for ascertaining or calculating frequencies or for frequency analysis.

The system therefor is advantageously designed so that, starting from the signal inputs for the speed output signals of the individual wheels or axles, the signal processing device has, (a) one or more filters (35–38) for the speed output signals of the individual wheels or axles, preferably low-pass filters, for filtering the speed output signals from high-frequency noise portions. (b) Including one or more comparator circuits, in particular Schmitt triggers (39–42) producing square wave signals, for the speed output signals of the individual wheels or axles, for converting the speed output signals into single-pulse signals. (c) Including one or more time control devices (50–53) (timers) that, for several successive and defined wheel rotation angles, measure the corresponding times for the partial rotations of the wheel determined by the defined wheel rotation angles, with the times being measured by ascertaining the time differences between two decreasing or increasing edges of the square wave signal that correlate with the times for the partial rotations. (d) Including one or more computer units (57–60) for calculating the frequencies of the times ascertained according to (c), taking the reciprocal. (e) Including one or more storage devices (61) for storing the frequencies calculated according to (d). (f) Including a computer circuit (62) for calculating an average value from several such successively calculated frequencies for one or more wheel rotations and for calculating the deviations of the frequencies ascertained and stored according to (d), from the calculated average value, and (g) a comparator (63) that compares the ascertained deviations with reference and/or threshold values and, when the reference and/or threshold values are exceeded, activates a warning signal.

An alternative advantageous embodiment of the system provides that, starting from the signal inputs for the speed output signals of the individual wheels or axles, the signal processing device has, (a) one or more filters (35–38) for the speed output signals of the individual wheels or axles, preferably low-pass filters, for filtering the speed output signals from high-frequency noise portions. (b) Including one or more comparator circuits, in particular Schmitt triggers (39–42) producing square wave signals, for the speed output signals of the individual wheels or axles, for converting the speed output signals into single-pulse signals. (c) Including one or more time control devices (50–53) (timers) that, for several successive and defined wheel rotation angles, measure the corresponding times for the partial rotations of the wheel determined by the defined wheel rotation angles, with the times being measured by ascertaining the time differences between two decreasing or increasing edges of the square wave signal that correlate with the times for the partial rotations. (d) Including one or more computer units (64–67) for carrying out a frequency analysis of the frequency spectrum of the times measured according to (c) as a function of the time (time signal) and for ascertaining the power spectral density. (e) Including one or more computer units (68–71) for integrating the power spectral densities ascertained over certain selected frequency intervals. (f) Including one or more storage devices (72) for storing several successively ascertained integrals, and (g) a comparator (73) that compares the ascertained integrals of the selected frequency intervals with a reference and/or threshold value and, when the reference and/or threshold values are exceeded, activates a warning signal.

In combination with the production of a defined and noticeable harmonic oscillation for the emergency running condition, an additional reliability in the information on and in the detection of the emergency running condition is achieved by such a device design in ascertaining the frequencies or the frequency analysis and the subsequent comparison with corresponding reference quantities.

In a further advantageous embodiment, the system is designed so that, starting from the signal inputs for the speed output signals of the individual wheels or axles, the signal processing device has, (a) one or more filters for the speed output signals of the individual wheels or axles, preferably low-pass filters, for filtering the speed output signals from high-frequency noise portions. (b) Including one or more comparator circuits, in particular Schmitt triggers producing square wave signals, for the speed output signals of the individual wheels or axles, for converting the speed output signals into single-pulse signals. (c) Including one or more time control devices (timers) that, for several successive and defined wheel rotation angles, measure the corresponding times for the partial rotations of the wheel determined by the defined wheel rotation angles, with the times being measured by ascertaining the time differences between two decreasing or increasing edges of the square wave signal that correlate with the times for the partial rotations. (d) Including a computer circuit for calculating the momentary wheel velocities corresponding to the times ascertained according to (c). (e) Including one or more storage devices for storing the momentary wheel velocities calculated according to (d). (f) Including a computer circuit for calculating an average value of the wheel velocity calculated according to (d) for one or more wheel rotations and for calculating the deviations of the wheel velocities ascertained according to (d) from the calculated average value, and (g) a comparator that compares the ascertained deviations with reference and/or threshold values and, when the reference and/or threshold values are exceeded, activates a warning signal.

As already presented in the previous method description, with such a design of the system, also in addition to the evaluation of the standard deviations of the zero value times or the frequency evaluation, a precise velocity analysis can be carried out in a simple manner, where further or additional evaluations based on the initial or intermediate quantity "zero value times" offer advantages with respect to an increased information reliability.

This is also true for the design of the device described below for carrying out an acceleration analysis, which can optionally likewise be connected.

For this purpose, the system is advantageously designed so that, starting from the signal inputs for the speed output signals of the individual wheels or axles, the signal processing device has, (a) one or more filters for the speed output signals of the individual wheels or axles, preferably low-pass filters, for filtering the speed output signals from high-frequency noise portions. (b) Including one or more comparator circuits, in particular Schmitt triggers producing square wave signals, for the speed output signals of the individual wheels or axles, for converting the speed output signals into single-pulse signals. (c) Including one or more time control devices (timers) that, for several successive and defined wheel rotation angles, measure the corresponding times for the partial rotations of the wheel determined by the defined wheel rotation angles, with the times being measured by ascertaining the time differences between two decreasing or increasing edges of the square wave signal that correlate with the times for the partial rotations. (d) Including a computer circuit for calculating the momentary wheel accelerations corresponding to the times ascertained according to (c). (e) Including one or more storage devices for storing the momentary wheel accelerations calculated according to (d). (f) Including a computer circuit for calculating an average value of the wheel acceleration calculated according to (d) for one or more wheel rotations and for calculating the deviations of the wheel accelerations ascertained according to (d) from the calculated average value, and (g) a comparator that compares the ascertained deviations with reference and/or threshold values and, when the reference and/or threshold values are exceeded, activates a warning signal.

This system can always be designed so that the signal processing device has an assigned or downstream computer unit that, over several wheel rotations, first calculates an average value from the values measured or calculated with respect to one wheel rotation at equal time intervals or at equal rotation angle intervals, i.e., times, frequencies, velocities, accelerations, and then makes it available for further signal processing.

As already shown in the corresponding method description, the signals produced with respect to one wheel rotation at equal time intervals or at equal rotation angle intervals in the course of a single wheel rotation, are averaged over several wheel rotations, which further reduces the influence of signal noise or briefly active disturbances, such as, for instance, any roadway unevenness, etc.

A method for ascertaining the emergency running condition of a pneumatic tire for vehicle wheels can be used particularly advantageously in a control system for vehicle wheels with pneumatic tires, in particular in an anti-lock braking system (ABS), in which, by utilizing the control system, a permanently present first periodic oscillation in proportion to the wheel rotation speed is produced at least on each axle, preferably on each wheel, and is fed to a signal processing device of the control system as a speed output signal, in which, in the emergency running condition, a separately defined second periodic oscillation that is characteristic of the emergency running condition and in proportion to the wheel rotation speed is superimposed on the first oscillation or the speed output signal, and in which the signal processing device of the control system detects a superimposition of the first periodic oscillation with the separately defined second periodic oscillation and processes it to produce a warning signal for the emergency running.

Such a use of the method yields a particularly simple connection and integration within already matured and tested systems for checking the vehicle data, so that only a few changes need to be made in the devices necessary therefor and in the electronics required in order to expand the capacity of such a control system, for example, an anti-lock braking system, by the important information of whether there is an emergency running condition on one wheel. The use of the present sensors and the evaluation electronics then makes it possible to obtain definite information on the emergency running condition in a particularly economical manner, even in series production.

Other exemplary embodiments and advantages of the present invention may be ascertained by reviewing the present disclosure and the accompanying drawing.

According to one aspect of the invention there is provided a method for ascertaining the emergency running condition of a pneumatic tire on a motor vehicle, the method including producing a permanently present first periodic oscillation in at least each axle proportional to a wheel rotation speed as a speed output signal, feeding the speed output signal to a signal processing device, wherein in an emergency running condition, the process further includes superimposing, on one of the first periodic oscillation and the speed output signal, at least one separately defined periodic oscillation related to the emergency running condition and proportional to an emergency running condition wheel rotation speed, detecting the superimposition of the first periodic oscillation with the at least one separately defined periodic oscillation characteristic of the emergency running condition in the signal processing device, and producing a warning signal.

The speed output signal may be produced using one of an active and a passive magnetic field sensor. The magnetic field sensor may be an encoder. The magnetic field sensor may have a rotating member a stationary member, the magnetic field sensor being situated on a part of the vehicle. The field sensor may be positioned on a part of the vehicle which is either stationary or rotates with the wheel, the magnetic field sensor producing a periodic magnetic field change in proportion to the wheel rotation speed. The at least one separately defined periodic oscillation may be produced by an emergency running device provided on the at least one wheel, the at least one separately defined periodic oscillation being produced when the wheel experiences one of damaged and a loss of air pressure. The at least one separately defined periodic oscillation may be produced by an emergency running support element which is arranged inside a pneumatic tire and on a rim of the wheel, the emergency running support element comprising a rolling circumference with discontinuities. The discontinuities may include one of cavities and concavities. The at least one separately defined periodic oscillation may be produced as a result of at least one material reinforcement formed inside a tire body of the wheel. The at least one material reinforcement may be arranged in a sidewall region of the tire body, the at least one material reinforcement comprising one of various layers and plies of strength supports which stabilize the tire body in the emergency running condition when the tire experiences damage or a loss of air pressure, the at least one material reinforcement having defined discontinuities distributed over a circumference region.

The discontinuities may include one of agglomerations of material and material voids. The at least one separately defined periodic oscillation may be produced by a first number of discontinuities distributed uniformly over a circumference of the tire body. The at least one separately defined periodic oscillation may be produced by each of a first number of discontinuities distributed uniformly over a circumference of the tire body and a second number of discontinuities, different from the first number, which are distributed uniformly over the circumference of the tire body.

The method may further include comparing the speed output signal, after being processed in the signal processing device, with at least one reference and threshold value. The method may further include recognizing when the at least one reference or threshold value is exceeded and producing the warning signal when the reference or threshold value is exceeded. The comparing may include comparing the speed output signal with a speed output signal of at least one other wheel, the at least one other wheel representing the at least one reference or threshold value.

In the signal processing device, the process may further include calculating a wheel velocity for a stipulated time interval from the speed output signal, comparing the wheel velocity with one of at least one reference wheel velocity and at least one threshold value, wherein the speed output signal is represented with an oscillation, and the process further includes ascertaining and storing for several successive and defined wheel rotation angles, corresponding times for partial rotations of the wheel determined by the defined wheel rotation angles, within defined count times $T_L$ containing several successive wheel rotation angles, calculating and storing an average wheel rotation velocity for at least one wheel rotation within the count times from the times ascertained for the partial rotations, and comparing one of average wheel rotation velocities and their course with the at least one reference wheel velocity or the at least one threshold value, wherein, when the at least one reference wheel velocity or the at least one threshold value is exceeded by the average wheel rotation velocity or the their coarse, a warning signal is activated.

In the signal processing device, the process may further include ascertaining and storing for several successive and defined wheel rotation angles, corresponding times for partial rotations of the wheel determined by the defined wheel rotation angles, calculating and storing an average from several such successively ascertained times for at least one wheel rotation, ascertaining deviations between the ascertained and stored times and the calculated and stored average, and comparing the ascertained deviations with one of at least one reference value and at least one threshold value, wherein, when the at least one reference value or the at least one threshold value is exceeded by the ascertained deviations, a warning signal is activated.

In the signal processing device, the process may further include ascertaining and storing for several successive and defined wheel rotation angles, corresponding times for partial rotations of the wheel determined by the defined wheel rotation angles, ascertaining a pattern of the corresponding times for partial rotations of the wheel using a pattern recognition process, and comparing the ascertained pattern with one of a reference pattern and at least one threshold value, wherein, when the ascertained pattern deviates from the reference pattern or the at least one threshold value, a warning signal is activated.

In the signal processing device, the process may further include ascertaining and storing for several successive and defined wheel rotation angles, corresponding times for partial rotations of the wheel determined by the defined wheel rotation angles, ascertaining and storing frequencies for the corresponding times for partial rotations of the wheel with the aid of at least one computer unit, calculating and storing reciprocals of the frequencies, calculating and storing averages of the frequencies, and ascertaining and storing deviations between the reciprocals and the averages, comparing the deviations with one of at least one reference value and at least one threshold value, wherein, when the at least one reference value or the at least one threshold value is exceeded by the deviations, a warning signal is activated.

In the signal processing device, the process may further include ascertaining and storing for several successive and defined wheel rotation angles, corresponding times for partial rotations of the wheel determined by the defined wheel rotation angles, ascertaining and storing a frequency spectrum of the corresponding times for partial rotations of the wheel with the aid of at least one computer unit, ascertaining power spectral densities by performing a frequency analysis on the frequency spectrum, integrating and storing the power spectral densities over certain selected frequency intervals with the aid of at least one computer unit, and comparing the integrated power spectral densities with one of at least one reference value and at least one threshold value, wherein, when the at least one reference value or the at least one threshold value is exceeded by the integrated power spectral densities, a warning signal is activated.

In the signal processing device, the process may further include ascertaining and storing for several successive and defined wheel rotation angles, corresponding times for partial rotations of the wheel determined by the defined wheel rotation angles, calculating and storing momentary wheel velocities from the corresponding times for the partial rotations of the wheel with the aid of at least one computer unit, calculating and storing averages from the momentary wheel velocities, ascertaining and storing deviations between the momentary wheel velocities and the averages, and comparing the deviations with one of at least one reference value and at least one threshold value, wherein, when the at least one reference value or the at least one threshold value is exceeded by the deviations, a warning signal is activated.

In the signal processing device, the process may further include ascertaining and storing for several successive and defined wheel rotation angles, corresponding times for partial rotations of the wheel determined by the defined wheel rotation angles, calculating and storing momentary wheel accelerations from the corresponding times for partial rotations of the wheel with the aid of at least one computer unit, calculating and storing averages of the momentary wheel accelerations, ascertaining deviations between the momentary wheel accelerations and one of the averages and a zero value, and comparing the deviations with one of at least one reference value and at least one threshold value, wherein, when the at least one reference value or the at least one threshold value is exceeded by the deviations, a warning signal is activated.

The deviations may be ascertained between the momentary wheel accelerations and zero values, the deviations being represented as time differences between the zero values which are measured in one of at least one time control device and at least one timer. The time differences may undergo a rotation-synchronous averaging before being further processed, such that an average is obtained over several wheel rotations from the zero value times measured with respect to one wheel rotation at equal time intervals or at equal rotation angle intervals, which average is then a basis for further signal processing.

According to another aspect of the invention, there is provided a system for ascertaining the emergency running condition of a pneumatic tire on a motor vehicle, the system including at least one sensor device arranged at least on each axle, the at least one sensor device adapted to supply a permanently present first periodic oscillation proportional to a wheel rotation speed as a speed output signal, the at least one sensor device comprising one of an active and a passive magnetic field sensor being mounted to one of rotate with the tire and be stationary, the at least one sensor device further comprising one of a magnetically active and passive transmitter device which rotates at the wheel rotation speed relative to a magnetic field sensor, the transmitter device being arranged complementary to the at least one passive and active magnetic field sensor and adapted to produce a periodic magnetic field change in proportion to the wheel rotation speed in a detection range, at least one signal processing device for processing and evaluating the speed output signal, the signal processing device being adapted to produce one of an output control and a warning signal, a transmission and a display device for at least one of the transmission and the display of the speed output signal, and for one of the transmission and the display of at least one of the output control and the warning signal, and an emergency running device arranged on the vehicle wheel which, in an emergency running condition, is adapted to produce at least one separately defined periodic oscillation related to the emergency running condition and proportional to the emergency running condition wheel rotation speed, wherein, in an emergency running condition, the at least one separately defined periodic oscillation is superimposed on one of the first periodic oscillation and or the speed output signal.

The at least one signal processing device may include at least one filtering device for filtering noise. The at least one signal processing device may include at least one storage device for storing one of reference and threshold values. The at least one signal processing device may include a comparator which, after processing, compares a respective speed output signal with one of at least one reference value and at least one threshold value, and detects a superimposition of the first periodic oscillation with the at least one separately defined periodic oscillation, such that when the reference value or the threshold value is exceeded, a warning signal is produced.

The emergency running device may include at least one emergency running support element arranged inside a tire of the wheel. The at least one emergency running support element may be supported on a rim of the wheel and comprises an emergency running surface having a circumference and a plurality of defined discontinuities distributed over the circumference. The discontinuities may include one of cavities and concavities. The emergency running device may include at least one material reinforcement formed inside a tire body of the wheel. The at least one material reinforcement may be arranged in a sidewall region of the tire body. The at least one material reinforcement may have a plurality of defined discontinuities distributed over a circumference portion of the tire body and comprises one of various layers and plies of strength supports, such that the at least one material reinforcement is adapted to stabilize the tire in the emergency running condition. The defined discontinuities may include one of material agglomerations and material voids. The defined discontinuities may be distributed uniformly over the circumference. The defined discontinuities nay be a first number of discontinuities distributed uniformly over the circumference and a second number of discontinuities, different from the first number, distributed uniformly over the circumference.

The speed output signal may be an input signal for the signal processing device and the signal processing device may further include one of at least one filter and at least one low-pass filter for filtering out high-frequency noise portions of the speed output signal, one of at least one comparator circuit and at least one Schmitt trigger for converting the speed output signal into a single-pulse square wave signal, one of at least one time control device and at least one timer which, for several successive and defined wheel rotation angles, measures corresponding times for partial rotations of the wheel determined by the defined wheel rotation angles, with the times being measured by ascertaining time differences between two decreasing or increasing edges of the square wave signal that correlate with the times for the partial rotations, at least one counting device connected in parallel to one of the at least one time control device and the at least one timer and receiving the single-pulse signal, the at least one counting device ascertaining one of the number of single pulses obtained and measured times within a defined count time $T_L$, at least one storage devices for storing the measured corresponding times for partial rotations of the wheel and the number of single pulses obtained within several successive count times $T_L$, a computer circuit for calculating and storing a average wheel rotation velocity within the count times $T_L$ for at least one wheel rotation from the times ascertained for the partial rotations and their numbers within the count times $T_L$, and a comparator for comparing one of the average wheel rotation velocity or their course with one of at least one reference value and at least one threshold value, wherein, when the at least one reference value or the at least one threshold value is exceeded by the averaged wheel rotation velocity or their coarse, a warning signal is activated.

The speed output signal is an input signal for the signal processing device and the signal processing device may further include one of at least one filter and at least one low-pass filter for filtering out high-frequency noise portions of the speed output signal, one of at least one comparator circuit and at least one Schmitt trigger for converting the speed output signal into a single-pulse square wave signal, one of at least one time control device and at least one timer which, for several successive and defined wheel rotation angles, measures corresponding times for partial rotations of the wheel determined by the defined wheel rotation angles, with the times being measured by ascertaining time differences between two decreasing or increasing edges of the square wave signal that correlate with the times for the partial rotations, at least one storage device for storing the measured corresponding times for partial rotations of the wheel, a computer circuit for calculating an average value from the measures corresponding times for partial rotations of the wheel and for calculating deviations of the measures corresponding times for partial rotations of the wheel from the average value, and a comparator for comparing the deviations with one of at least one reference value and at least one threshold value, wherein, when the at least one reference value or the at least one threshold value is exceeded by the deviations, a warning signal is activated.

The speed output signal is an input signal for the signal processing device and the signal processing device may further include one of at least one filter and at least one low-pass filter for filtering out high-frequency noise portions of the speed output signal, one of at least one comparator circuit and at least one Schmitt trigger for converting the speed output signal into a single-pulse square wave signal, one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations, at least one computer unit for calculating frequencies of the measured corresponding times for partial rotations of the wheel and taking the reciprocal of the frequencies, at least one storage device for storing the calculated frequencies, a computer circuit for calculating an average value of several successively calculated frequencies and for calculating deviations of the calculated frequencies from the average value, and a comparator for comparing the deviations with one of at least one reference value and at least one threshold value, wherein when the at least one reference value or the at least one threshold value is exceeded by the deviations, a warning signal is activated.

The speed output signal is an input signal for the signal processing device and the signal processing device may further include one of at least one filter and at least one low-pass filter for filtering out high-frequency noise portions of the speed output signal, one of at least one comparator circuit and at least one Schmitt trigger for converting the speed output signal into a single-pulse square wave signal, one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations, at least one computer unit for carrying out a frequency analysis of a frequency spectrum of the measured corresponding times for partial rotations of the wheel as a function of a time or time signal and for ascertaining power spectral densities, at least one computer unit for integrating the power spectral densities ascertained over certain selected frequency intervals, at least one storage device for storing several successively ascertained integrals, and a comparator for comparing the ascertained integrals with one of at least one reference value and at least one threshold value, wherein, when the at least one reference value or the at least one threshold value is exceeded by the ascertained integrals, a warning signal is activated.

The speed output signal is an input signal for the signal processing device and the signal processing device may further include one of at least one filter and at least one low-pass filter for filtering out high-frequency noise portions of the speed output signal, one of at least one comparator circuit and at least one Schmitt trigger for converting the speed output signal into a single-pulse square wave signal, one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations, a computer circuit for calculating momentary wheel velocities of the measured corresponding times for partial rotations of the wheel, at least one storage device for storing calculated momentary wheel velocities, a computer circuit for calculating an average value of the momentary wheel velocities and for calculating deviations of the momentary wheel velocities from the average value, and a comparator for comparing the deviations with one of at least one reference value and at least one threshold value, wherein, when the at least one reference value or the at least one threshold value is exceeded by the deviations, a warning signal is activated.

The speed output signal is an input signal for the signal processing device and the signal processing device may further include one of at least one filter and at least one low-pass filter for filtering out high-frequency noise portions of the speed output signal, one of at least one comparator circuit and at least one Schmitt trigger for converting the speed output signal into a single-pulse square wave signal, one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations, a computer circuit for calculating momentary wheel accelerations of the measured corresponding times for partial rotations of the wheel, at least one storage device for storing calculated momentary wheel accelerations, a computer circuit for calculating an average value of the momentary wheel accelerations and for calculating deviations of the momentary wheel accelerations from the average value, and a comparator for comparing the deviations with one of at least one reference value and at least one threshold value, wherein, when the at least one reference value or the at least one threshold value is exceeded by the deviations, a warning signal is activated.

The speed output signal may be fed from some portion of an anti-locking braking system. An anti-locking braking system is coupled to the signal processing device.

According to another aspect of the invention, there is provided a method for ascertaining an emergency running condition of a pneumatic tire on a motor vehicle, the method including sensing a permanently present first periodic oscillation proportional to a wheel rotation speed of at least one wheel of the motor vehicle, the at least one wheel comprising an emergency running device which produces at least one periodic oscillation characteristic of an emergency running condition when the wheel experiences substantial damage or a substantial loss of air pressure, the sensing being performed by at least one sensor device disposed adjacent the at least one wheel, feeding a speed output signal from the at least one sensor device to at least one filter which filters out high-frequency noise portions of the speed output signal, converting the speed output signal into a square wave signal of single pulses using one of at least comparator circuit and at least one Schmitt trigger, processing the single pulses using at least one processing device and producing at least one output, storing the at least one output in a storage device, subjecting the at least one output to a calculation with a computer circuit to produce at least one value, comparing the at least one value with one of at least one reference value and at least one threshold value using a comparator, and producing at least one warning signal on a display device when the at least one value exceeds the at least one reference value or the at least one threshold value, wherein the at least one warning signal is produced when the tire experiences the emergency running condition.

The processing may be performed by two processing devices, one processing device comprising a time control device and the other processing device comprising a counting device. The processing may be performed by the at least one processing device which comprising a time control device. The processing may be performed by two processing devices, one processing device comprising a time control device and the other processing device comprising a computer which utilizes a formula.

According to still another aspect of the invention, there is provided a method for ascertaining an emergency running condition of a pneumatic tire on a motor vehicle, the method including sensing a permanently present first periodic oscillation proportional to a wheel rotation speed of at least one wheel of the motor vehicle, the at least one wheel comprising an emergency running device which produces at least one periodic oscillation characteristic of an emergency running condition when the wheel experiences substantial damage or a substantial loss of air pressure, the sensing being performed by at least one sensor device disposed adjacent the at least one wheel, feeding a speed output signal from the at least one sensor device to at least one filter which filters out high-frequency noise portions of the speed output signal, converting the speed output signal into a square wave signal of single pulses using one of at least one comparator circuit and at least one Schmitt trigger, processing the single pulses using one of at least one time control device and at least one timer and producing a frequency spectrum, feeding the frequency spectrum to a computer and performing a frequency analysis using a Fourier transform to ascertain power spectral densities, integrating the power spectral densities using a computer and an integral so as to produce ascertained integrals, feeding the ascertained integrals to at least one a storage device, comparing the ascertained integrals with one of at least one reference value and at least one threshold value using a comparator, and producing at least one warning signal on a display device when the ascertained integrals exceed the at least one reference value or the at least one threshold value, wherein the at least one warning signal is produced when the tire experiences the emergency running condition.

The invention also provides for a system for ascertaining an emergency running condition of a pneumatic tire on a motor vehicle, the system including a plurality of wheel sensor devices disposed on the vehicle, each wheel sensor device including one of an active or passive magnetic field sensor being disposed adjacent each wheel of the vehicle, each wheel sensor device supplying a permanently present first periodic oscillation in proportion to a wheel rotation speed in the form of a speed output signal, a signal processing device receiving the speed output signal, the signal processing device including a plurality of low-pass filters for filtering out high-frequency noise portions of the speed output signal, a Schmitt trigger connected to each low-pass filter, a time control device connected to each Schmitt trigger, a storage device connected to the time control devices, a computer circuit connected to the storage device, a comparator connected to the computer circuit, and a display connected to the comparator, wherein the signal processing device processes and evaluates the speed output signal, the signal processing device being adapted to produce a warning signal on the display device when the wheel experiences the emergency running condition.

The signal processing device may further include a counting device connected to each Schmitt trigger and connected to the storage device. The signal processing device may further include a computer using a formula connected to each Schmitt trigger and connected to the storage device.

The system may further an emergency running device disposed on each wheel. The emergency running device may have at least one emergency running support element arranged inside a tire of the wheel. The emergency running support element may be supported on a rim of the wheel and comprises an emergency running surface having a circumference and a plurality of defined discontinuities distributed over the circumference.

The invention also provides for a system for ascertaining the emergency running condition of a pneumatic tire on a motor vehicle, the system including a plurality of wheel sensor devices disposed on the vehicle, each wheel sensor device including one of an active or passive magnetic field sensor being disposed adjacent each wheel of the vehicle, each wheel sensor device supplying a permanently present first periodic oscillation in proportion to a wheel rotation speed in the form of a speed output signal, a signal processing device receiving the speed output signal, the signal processing device including a plurality of low-pass filters for filtering out high-frequency noise portions of the speed output signal, a Schmitt trigger connected to each low-pass filter, a time control device connected to each Schmitt trigger, a computer utilizing a Fourier transform connected to each time control devices, a computer utilizing an integral connected to the computer utilizing the Fourier transform, a storage device connected to the computer utilizing the integral, a comparator connected to the storage device, and a display connected to the comparator, wherein the signal processing device processes and evaluates the speed output signal, the signal processing device being adapted to produce a warning signal on the display device when the wheel experiences an emergency running condition.

The system may further include an emergency running device disposed on each wheel. The emergency running device may have at least one emergency running support element arranged inside a tire of the wheel. The emergency running support element may be supported on a rim of the wheel and comprises an emergency running surface having a circumference and a plurality of defined discontinuities distributed over the circumference.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5b shows an enlarged representation (magnified) of the time interval marked in FIG. 5a;

FIG. 6b shows the time behavior of an oscillation ascertained with the aid of sensor devices and in proportion to the wheel rotation speed, with a superimposed nth-order oscillation of the tire period (superimposed speed output signal) in comparison with the normal speed output signal according to FIG. 6a;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
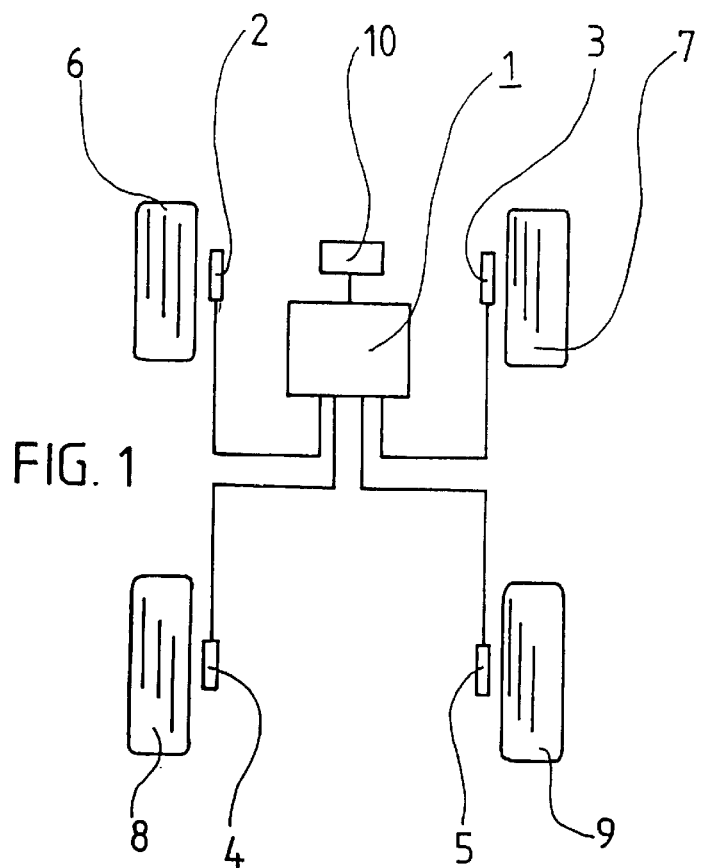
FIG. 1 shows a schematic diagram of the arrangement of a device of the invention inside a motor vehicle.

FIG. 1, shows the arrangement of a device of the invention inside a motor vehicle, and shows a central computer or evaluating unit 1 that is connected to sensor devices 2–5, which in turn are assigned to the individual wheels 6–9.

The sensor devices detect the speed output signals of the individual wheels and feed these to the central computer unit, whose output side is connected to a display and warning device 10, for instance, with an optical warning display arranged in the instrument panel in the driver's field of view.

The central computer unit contains a signal processing unit with all the devices necessary for evaluating and comparing the speed output signals of the individual wheels and for producing a warning signal in the display device 10.

Figures 2A, 2B:
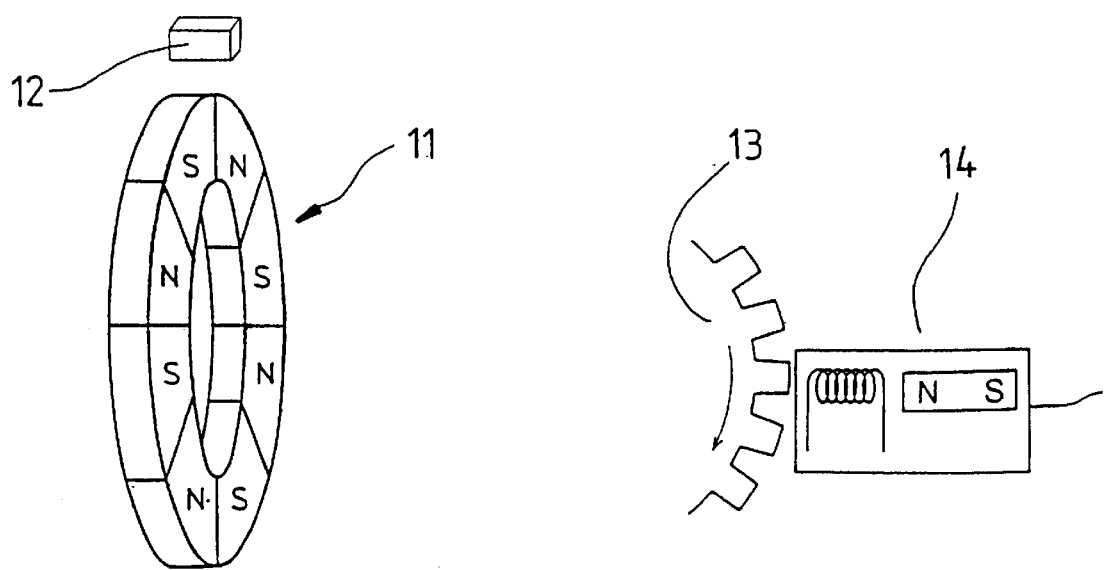
FIG. 2a shows a schematic diagram of a sensor device for the wheel rotation speed present in prior art and provided with an active transmitter device.
FIG. 2b shows a schematic diagram of a sensor device for the wheel rotation speed present in prior art and provided with a passive transmitter device.

FIG. 2a shows the schematic diagram of the sensor device used in the device of the invention, which is known per se, with an active transmitter device present in each case in the form of a magnet wheel 11 rotating with the respective wheel, which magnet wheel produces a periodic magnetic field change in the magnetic field sensor 12 that is evaluated in the signal processing device belonging to the central computer unit as a speed output signal in the form of a periodic oscillation in proportion to the wheel rotation speed, and is processed. The sensor device can be utilized, e.g., in an anti-lock braking system (ABS).

FIG. 2b shows a schematic diagram of an alternative sensor device likewise present in prior art, with a passive transmitter device being present here in the form of a toothed metallic wheel 13 on its circumference, whose speed is detected via a specifically designed magnetic field sensor 14.

Figure 2C:
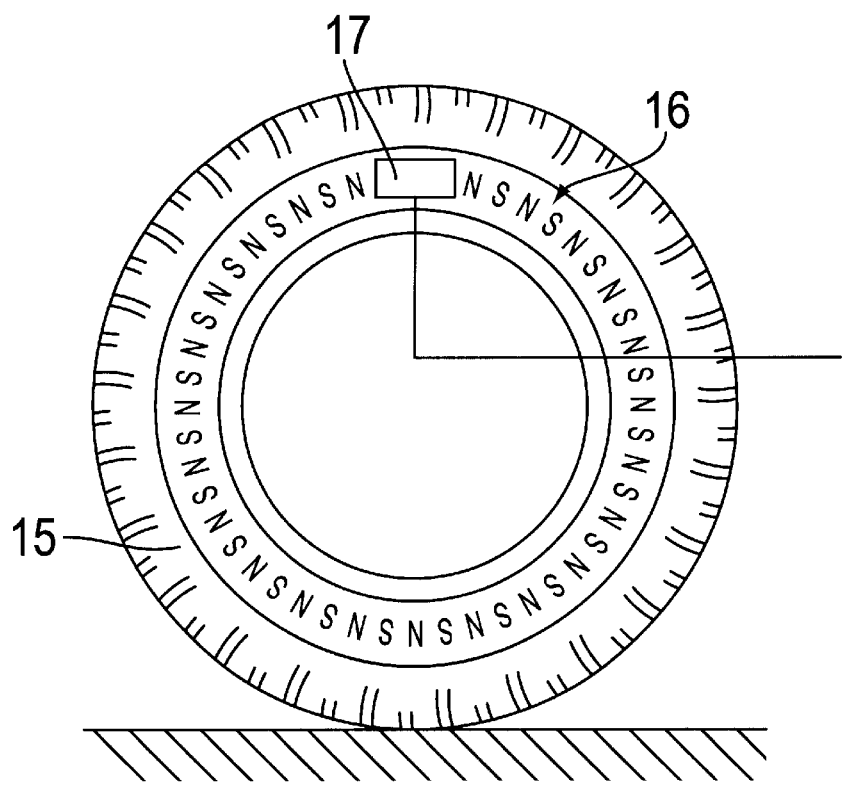
FIG. 2c shows a schematic diagram of a sensor device for the wheel rotation speed present in prior art and provided with an active transmitter device in the form of permanent-magnetic areas arranged in the tire sidewall.

FIG. 2c shows a further known alternative of a sensor device in a schematic diagram, with an active transmitter device arranged in the form of permanent-magnetic areas 16 arranged in the tire sidewall 15. The speed of a tire thus equipped is then detected via an appropriately designed magnetic field sensor 17.

Figure 3:
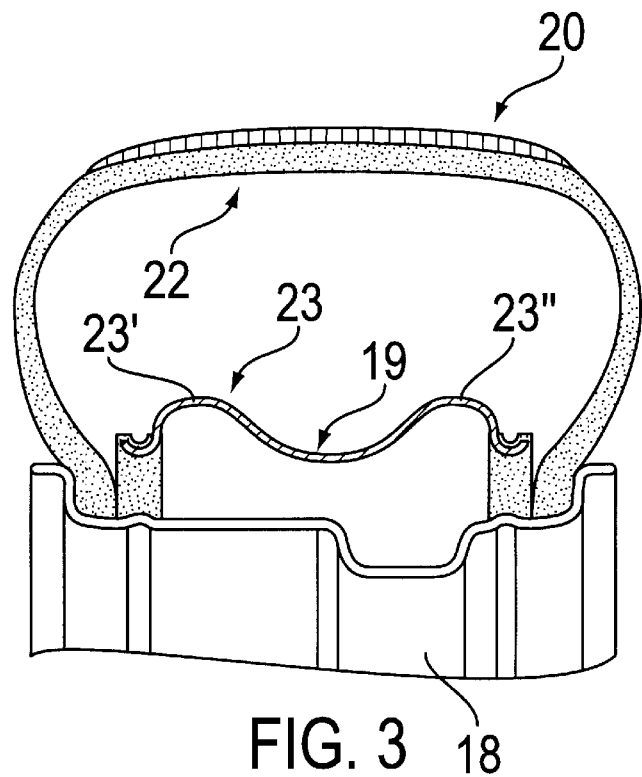
FIG. 3 shows an emergency running device for producing one or more periodic oscillations that are characteristic of the emergency running condition and in proportion to the wheel rotation speed, in the form of an emergency running support element supported on the rim.
Figure 4:
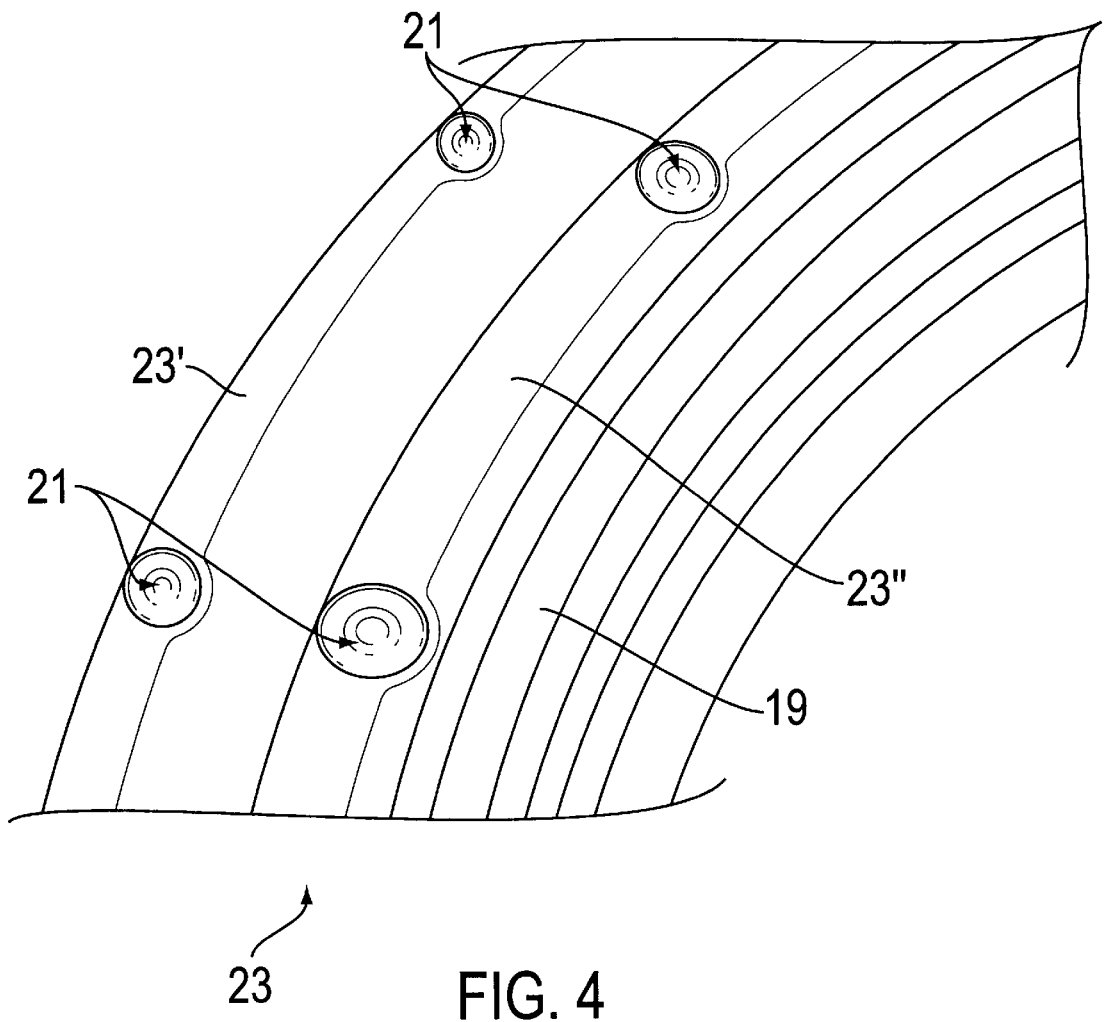
FIG. 4 shows a section of an emergency running support element according to FIG. 3 with concavities in the emergency running surface distributed over the circumference.

FIG. 3 shows an emergency running device provided in a pneumatic tire, which according to the invention, produces one or more periodic oscillations that are characteristic of the emergency running condition and in proportion to the wheel rotation speed. Emergency running support element 19 is supported on a rim 18. The emergency running support element is situated inside a tire 20 shown here in cross section and is provided on its emergency running surface 23 with concavities 21 distributed over the circumference, as is shown more clearly in FIG. 4. A total of 13 equal concavities 21 are distributed uniformly over the circumference of emergency running support element 19, which also includes two convexities 23' and 23" projecting towards the inside of the tire tread, i.e., radially outwards. Thus, concavities 21 are symmetrically formed on convexities 23' and 23".

When there is a sudden loss of air (or air pressure), inside 22 of the tire lies on the outer surface of emergency running surface 23 of emergency running support element 19, which enables safe operation of the vehicle adequate for the emergency running condition and reliably prevents the tire from flying off the rim.

Figure 5A:
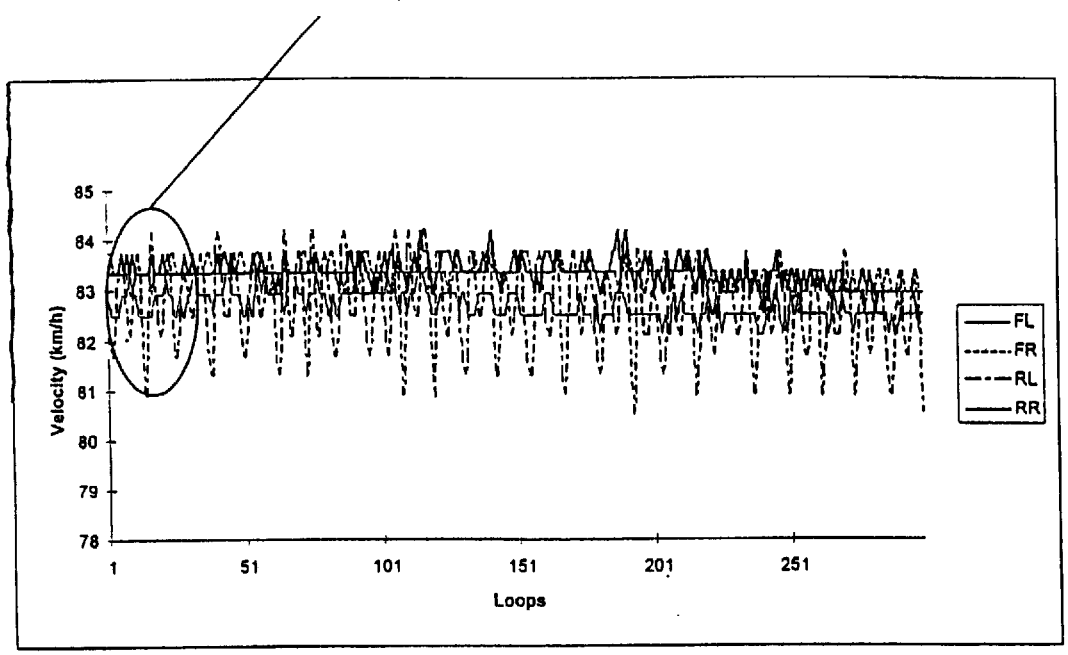
FIG. 5a shows a diagram that shows the evaluation of the processed wheel velocities of the individual wheels ascertained via the wheel rotation speed with the aid of sensor devices within defined count times (loops)

FIG. 5a shows a diagram that shows the evaluation of the wheel velocities of the individual wheels (designated as FL, FR, RL, RR) within defined count times $T_L$ (loop time), which velocities have been ascertained with the aid of the sensor devices for the wheel rotation speed and processed in the signal processing device.

The defined count times (i.e., quantity of count times) are shown here on the abscissa, whereas the ordinates contain the wheel velocities of the individual wheels. The diagram shows synchronously the wheel velocities of all four wheels, namely the front left wheel (FL), the front right wheel (FR), the rear left wheel (RL), and the rear right wheel (RR).

Figure 5B:
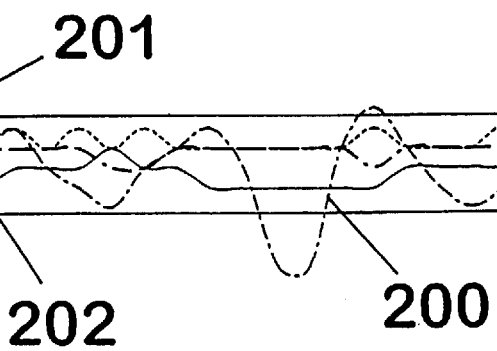

The different wheel velocities are more clearly recognizable in FIG. 5b, which shows an enlarged (magnified) representation of time interval 24 marked in FIG. 5a.

FIGS. 5a and 5b show the evaluation for a vehicle whose rear left wheel (RL) is in the emergency running condition after a sudden loss of pressure.

It can already be seen here, in a very simple velocity evaluation, that the course of the velocity of the rear left (RL) wheel is clearly detectable as being different from the velocity courses of the other wheels, where about 11 count times (loops) represent one wheel rotation. The velocity curve 200 representing the velocity course of the rear left wheel, whose characteristic is produced by a separately defined periodic oscillation in proportion to the wheel rotation speed, which is again excited by a number of concavities arranged in a uniform distribution over the emergency running surface of the emergency running support element situated in the rear left wheel, can be checked easily and with conventional devices with reference or threshold values 201 and 202 for the wheel velocity and can be detected as a velocity curve representative of an emergency running condition, even when this is influenced by bodywork or structural oscillations and resonances.

FIGS. 6a and 6b and 7a–7e show that a separately defined oscillation that is characteristic of the emergency running condition in proportion to the wheel rotation speed and has been superimposed on the speed output signal, which oscillation is produced by concavities on the emergency running surface 23 or on the rolling circumference of an emergency running support element 19, is clearly recognizable.

Figure 6A:
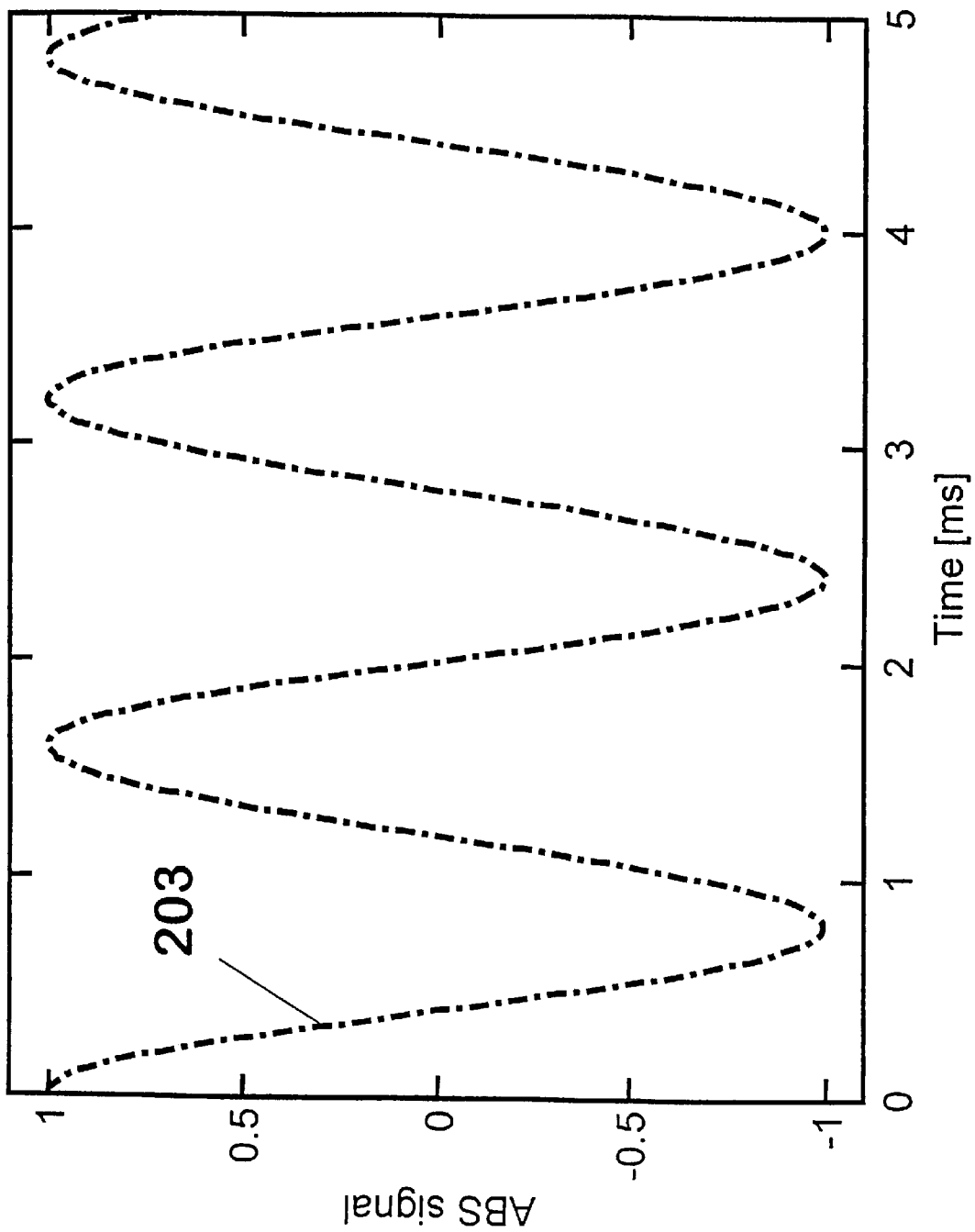
FIG. 6a shows the time behavior of an undisturbed proportional oscillation ascertained with the aid of sensor devices and in proportion to the wheel rotation speed (normal speed output signal) at constant velocity.

In these schematic and merely qualitative representations, FIG. 6a first shows the time behavior of a normal speed output signal, represented by the curve 203, for example, an ABS signal, at constant velocity without emergency running, i.e., in the normal condition.

Figure 6B:
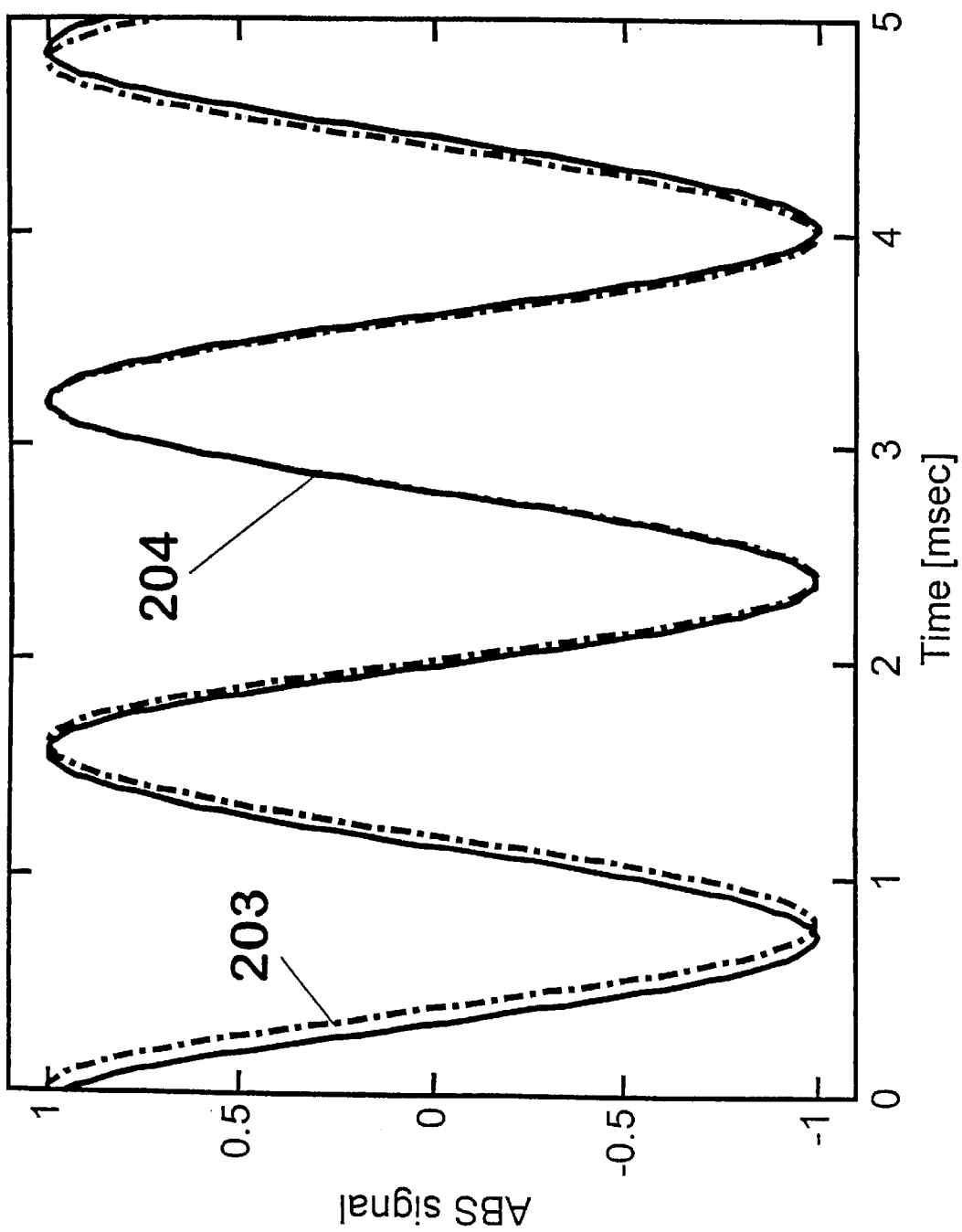

If a separately defined nth-order oscillation of the tire period that is characteristic of the emergency running condition and in proportion to the wheel rotation speed, here a 13th-order harmonic oscillation of the tire period produced by 13 concavities distributed uniformly over the circumference, is produced with the aid of the device of the invention, i.e., with concavities on emergency running surface 23 or on the rolling circumference of an emergency running support element 19, and is superimposed on the speed output signal, the time behavior of the superimposed speed output signal shown qualitatively in FIG. 6b by the curve 204 is obtained, shown in comparison to the non-superimposed, i.e., normal, speed output signal according to the curve 203.

Figure 7A:
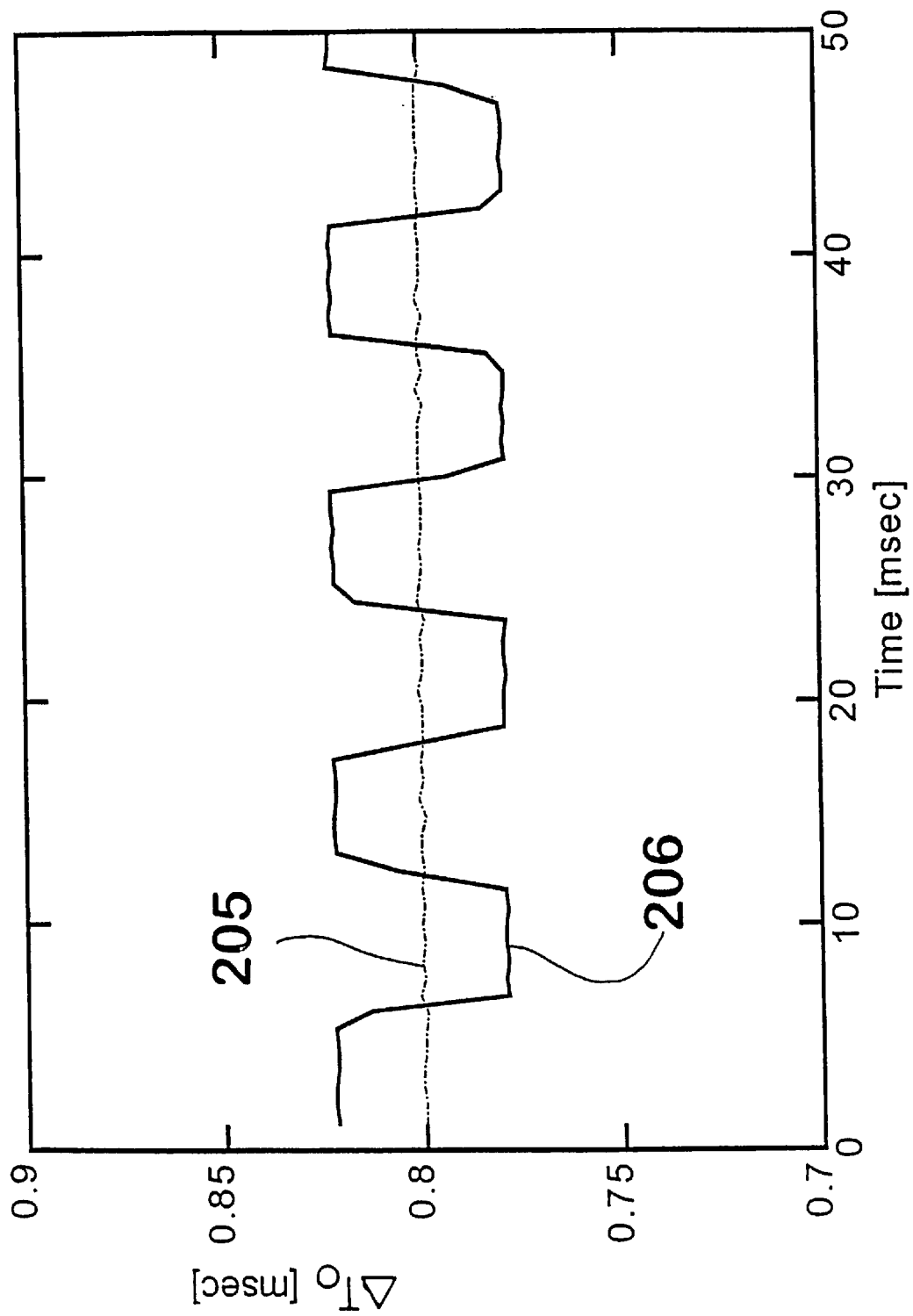
FIG. 7a shows the zero value times $\Delta T_{0(i)}$ (t) (zero value time signal) of the normal and the superimposed speed output signal according to FIG. 6b and plotted on a time axis, which was ascertained with the aid of a time control device (timer) measuring the time differences between the zero values of the single pulses obtained.

FIG. 7a shows the times ascertained for the partial rotations of the wheel determined by the defined wheel rotation angles, plotted on a time axis, in the form of a zero value time signal $\Delta T_{0(i)}$ (t) of the normal and superimposed speed output signal according to FIG. 6b as the curves 205 and 206, which were ascertained with the aid of a time control device (timer) measuring the times/time differences between the zero values of the single pulses obtained.

It is clear from this that the zero value times of the normal speed output signal according to FIG. 6b corresponding to the curve 205 remain essentially constant and are at about 0.8 msec, apart from disturbing influences evidenced by slight fluctuations, as can be caused, for example, by changes in velocity, roadway surface, signal noise, etc.

The zero value times of the superimposed speed output signal according to FIG. 6b, on the other hand, show clearly noticeable periodic deviations of about 0.02 msec corresponding to the curve 206 and their absolute value fluctuates between about 0.78 and 0.82 msec.

Figure 7B:
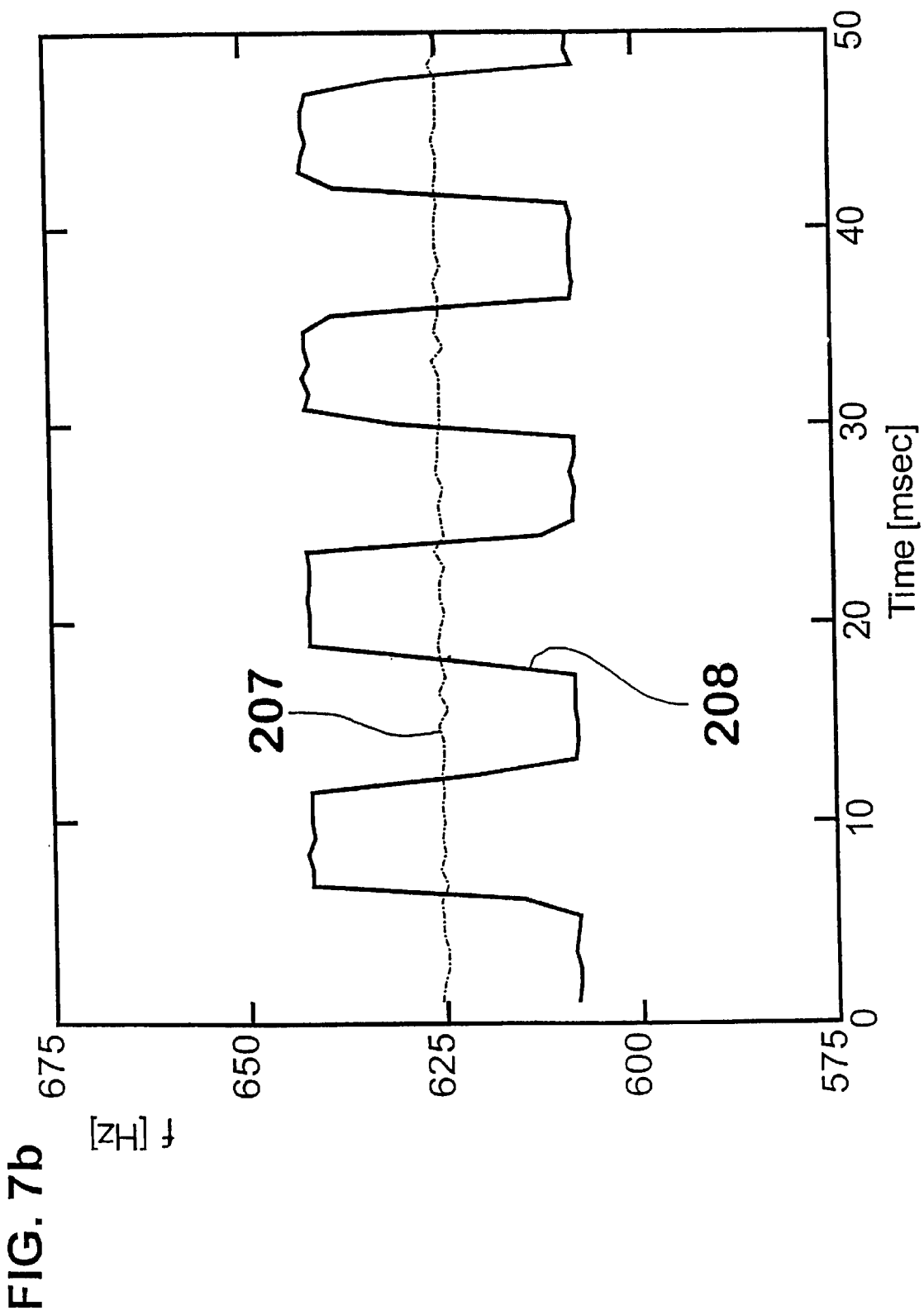
FIG. 7b shows the frequencies ascertained by taking the reciprocal of the zero value times according to FIG. 7a and plotted on a time axis.

FIG. 7b shows the frequencies of the zero value times according to FIG. 7a, ascertained by taking the reciprocal in accordance with the already described formula $f_{(i)}$ (t)=0.5/$\Delta T_{0(i)}$ (t) and plotted on a time axis. Here as well, it is clear that the ascertained frequencies of the zero value times of the normal speed output signal according to FIG. 6b corresponding to the curve 207 remain essentially constant and, in this case, are at about 625 Hz, apart again from disturbing influences evidenced merely by slight fluctuations.

The correspondingly ascertained frequencies of the zero value times of the superimposed speed output signal according to FIG. 7a corresponding to the curve 208, on the other hand, show clearly noticeable periodic deviations that are particularly clearly detectable, with the absolute value of the frequencies fluctuating between about 610 Hz and 640 Hz.

Figure 7C:
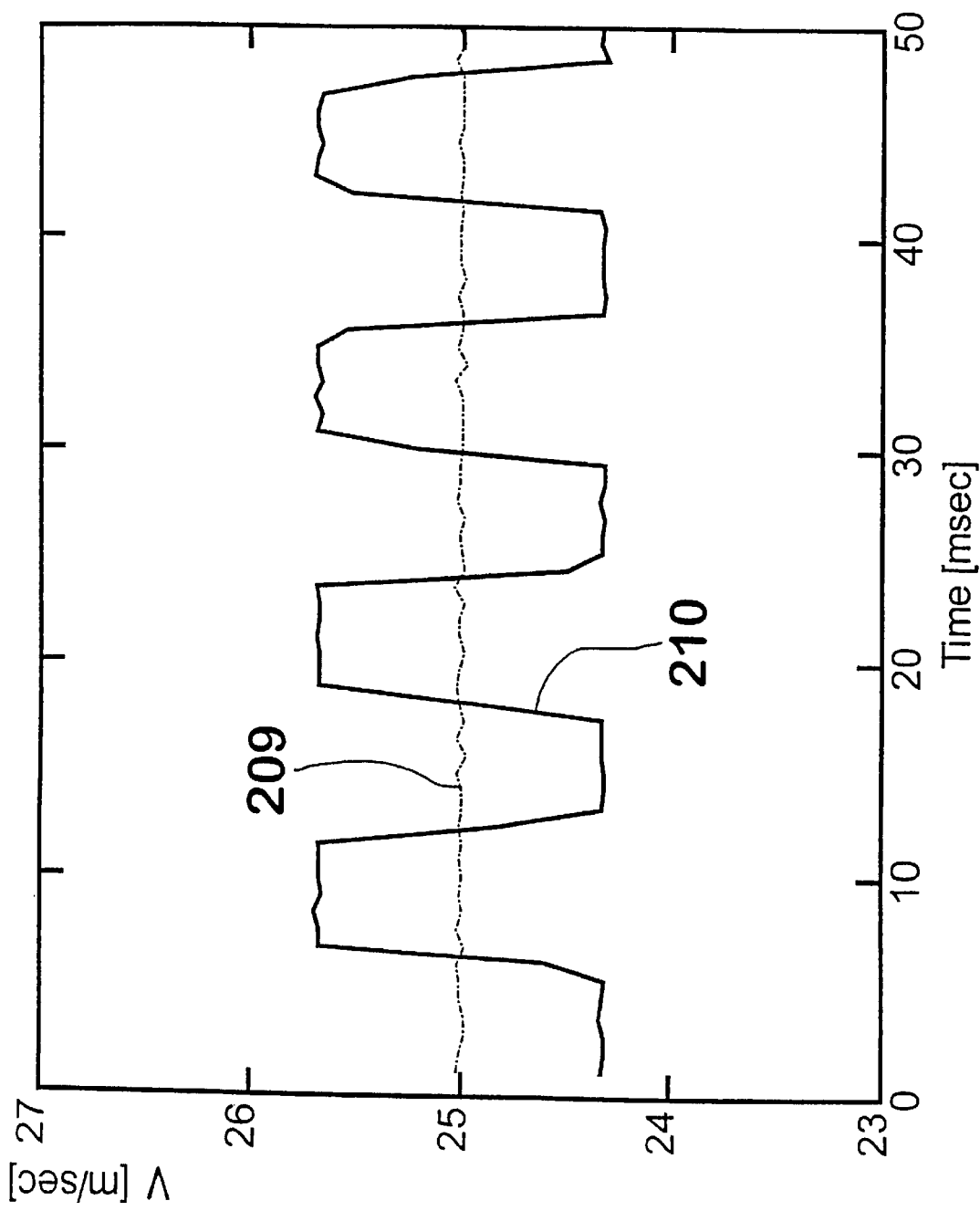
FIG. 7c shows the wheel velocity calculated from the zero value times according to FIG. 7a and plotted on a time axis.

FIG. 7c shows the wheel velocities ascertained from the zero value times according to FIG. 7a in accordance with the already described formula $v_{(i)}$ (t)=0.02 m/$\Delta T_{0(i)}$ (t) and plotted on a time axis. Here as well, it is clear that the wheel velocities ascertained from the normal speed output signal corresponding to the curve 209 remain essentially constant and, in this case, are at about 25 m/sec, whereas the wheel velocities ascertained from the superimposed speed output signal corresponding to the curve 210, on the other hand, show clearly detectable periodic deviations, with the absolute value of the wheel velocities fluctuating between about 24.2 m/sec and 25.8 m/sec.

Figure 7D:
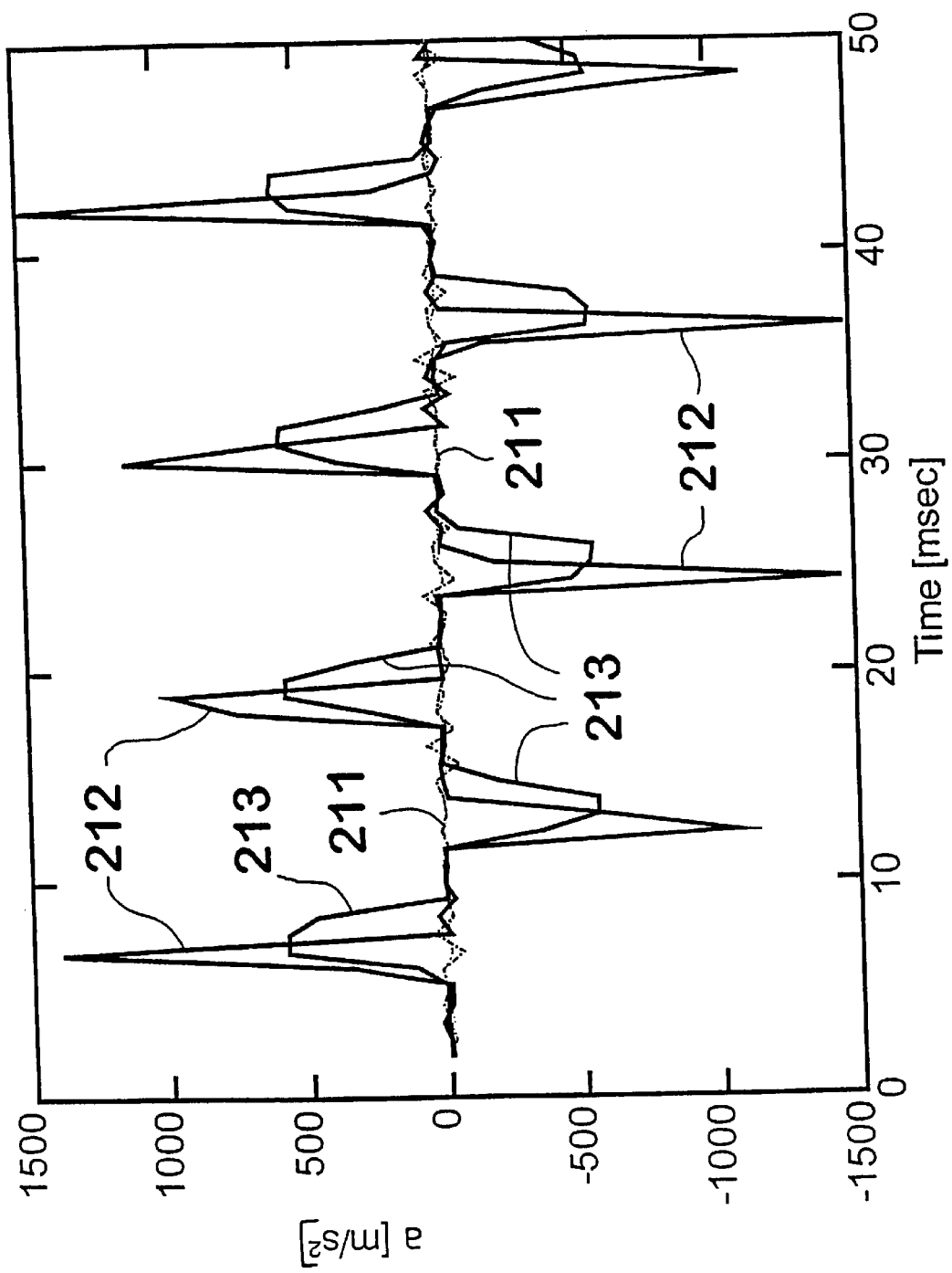
FIG. 7d shows the wheel acceleration calculated from the wheel velocities according to FIG. 7c and plotted on a time axis.

FIG. 7d shows the wheel acceleration calculated from the wheel velocities according to FIG. 7c in accordance with the already described formula $a_{(i)}$ (t)=$[v_{(i)}-v_{(i-1)}]/\Delta T_{0(i)}$ (t) and plotted on a time axis. Here, it is evident that the wheel accelerations ascertained from the wheel velocities of the normal speed output signal corresponding to the curve 211 remain essentially constant, whereas the wheel accelerations ascertained from the wheel velocities of the superimposed speed output signal corresponding to the curve 212, on the other hand, show clearly detectable periodic deviations. The curve 213 shows the wheel accelerations of the curve 212 filtered by averaging. Such filtering can sometimes be advisable since, owing to the coarsening character of a differentiation, the acceleration curves are frequently particularly noisy, so that a more reliable and easier evaluation can be performed after the filtering.

Figure 7E:
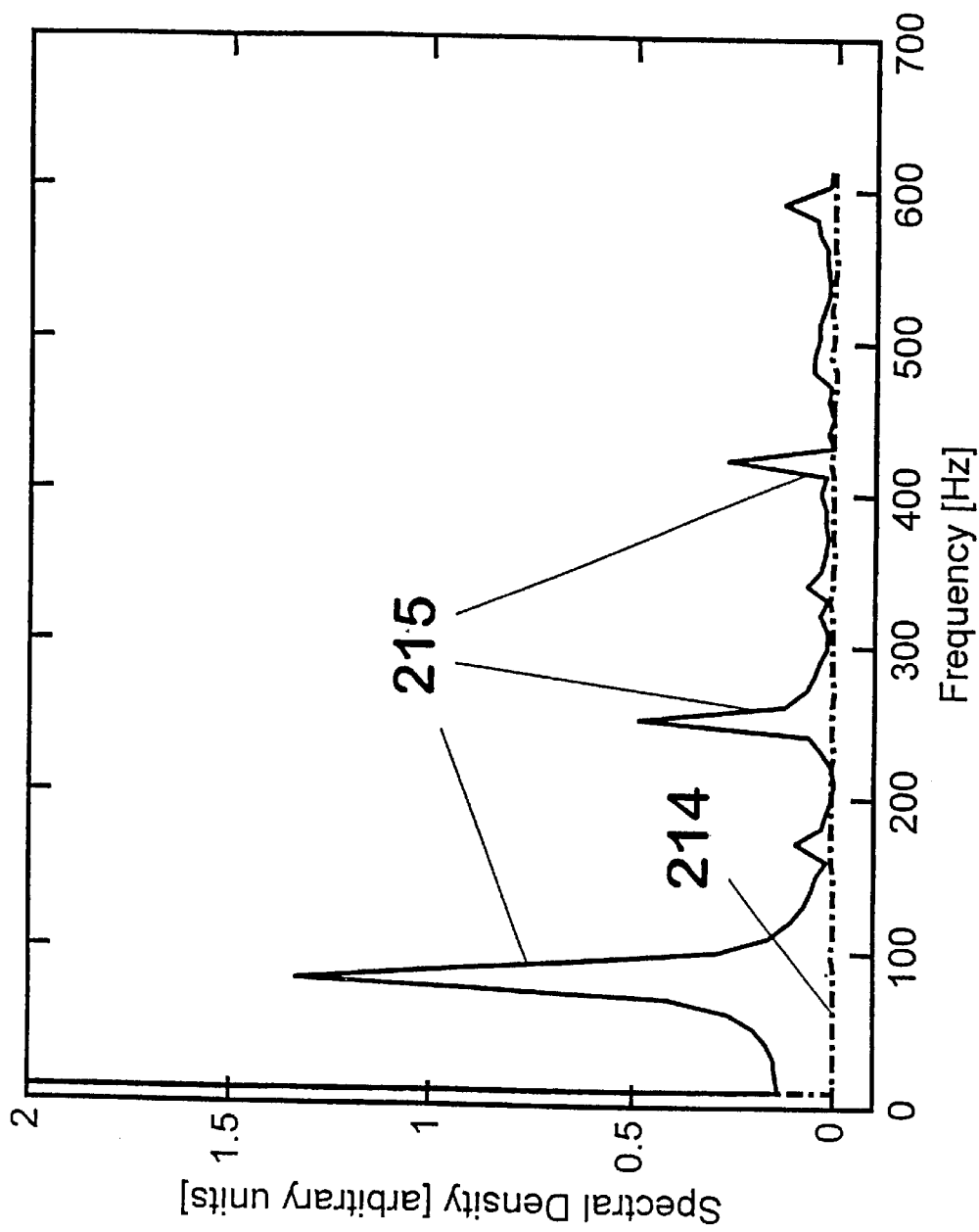
FIG. 7e shows the power spectral density ascertained with the aid of a frequency analysis of the zero value time signal according to FIG. 7a, plotted over the frequency.

FIG. 7e shows the power spectral density ascertained using a frequency analysis of the zero value time signal according to FIG. 7a, here, in fact, with the aid of a fast Fourier transform (FFT), and plotted over the frequency. It is evident here that the power spectral density according to the curve 215 ascertained from the zero value time signal of the superimposed speed output signal shows clear peaks in comparison with the power spectral density according to the curve 214 ascertained from the zero value time signal of the normal speed output signal. The shape and arrangement of the peaks shown here are caused by a 13th-order harmonic oscillation of the tire period produced with the aid of 13 concavities on an emergency running support element and distributed uniformly over the circumference, with the frequency intervals to be observed being, among other things, independent of the order of the superimposed oscillation and of the wheel velocity. For the further evaluation in such certain frequency ranges, the integral of the power spectral density curves is compared with reference or threshold values or else with one another.

Figure 7F:
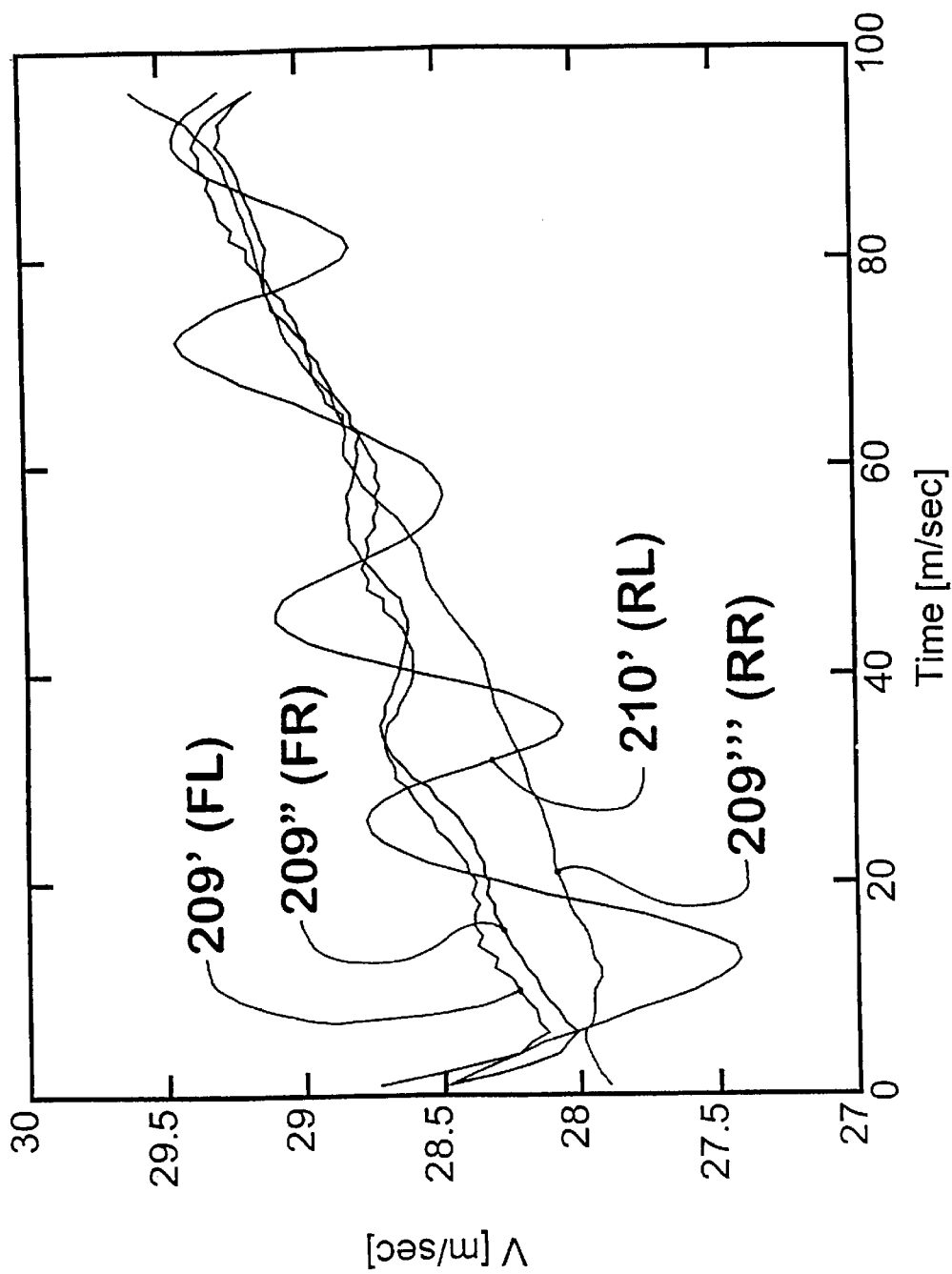
FIG. 7f shows the wheel velocities of all four wheels calculated from the zero value times and plotted on a time axis, after evaluation of real speed output signals and those sensed on the traveling vehicle.

In contrast to the above qualitative representations, FIG. 7f shows the evaluation of real speed output signals sensed on the traveling vehicle, where the wheel velocities of all four wheels ascertained from zero value times in accordance with the already described formula $v_{(i)}$ (t)=0.02 m/$\Delta T_{0(i)}$ (t), similar to the qualitative representation of a wheel shown in FIG. 7c, are shown here. For improved recognition and to reduce the influence of signal noise, six successive calculations of the zero value times (six edge signals) were averaged.

Based on this evaluation, the definite detection of the emergency running condition in real situations made possible according to the invention is particularly clear. The wheel velocities ascertained from the normal speed output signal, corresponding to the curves 209' (FL), 209" (FR), and 209'" (RR), except for disturbance quantities and signal noise, remain essentially constant or rise almost uniformly in the velocity increase present here (acceleration), whereas the wheel velocities corresponding to the curve 210' and ascertained from the superimposed speed output signal of the rear left wheel (RL) that is in the emergency running condition, on the other hand, show clearly detectable periodic deviations.

Figure 8:
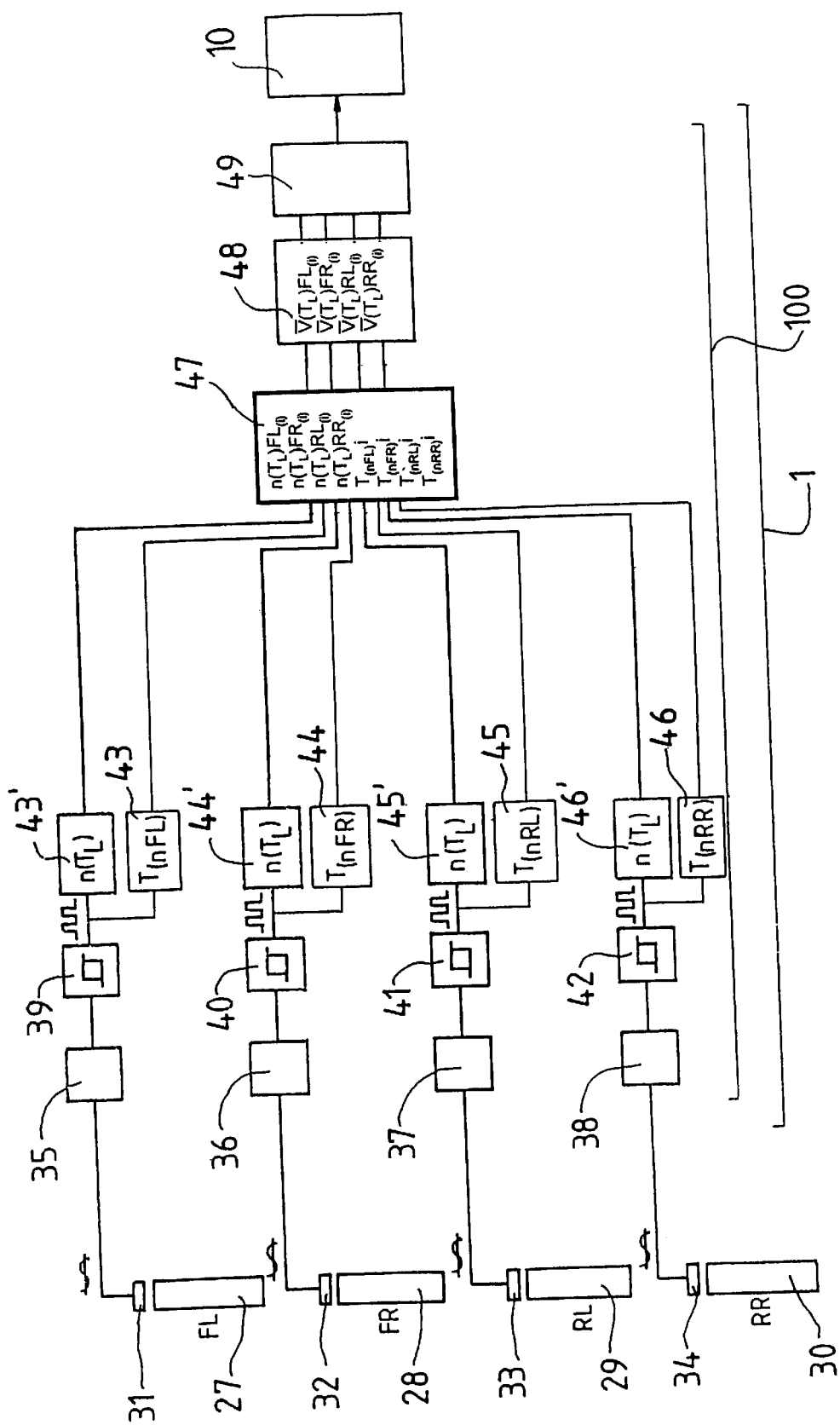
FIG. 8 shows a schematic representation of a signal processing of a device of the invention as a flow diagram, which signal processing is based on the evaluation according to the method, of the numbers of single pulses obtained within a defined count time $T_L$ (loop time) of the normal or superimposed speed output signal.

FIG. 8 shows a schematic representation of a signal processing of a device according to the invention as a flow diagram, which signal processing is based on the evaluation according to the method of the numbers of single pulses obtained within a defined count time $T_L$ (loop time) of the normal or superimposed speed output signal, in which, in the processing diagram shown here, an average wheel rotation velocity is ascertained within defined count times $T_L$ containing several successive wheel rotation angles, from the times ascertained for the partial rotations and their number for one or more wheel rotations within the count times $T_L$ (loop time).

The schematic diagram first shows the sensor devices arranged on the individual wheels front left (FL), front right (FR), rear left (RL), and rear right (RR) and including active transmitter devices 27–30 designed as magnet wheels according to FIG. 2a and the magnetic field sensors 31–34 respectively assigned thereto.

The speed output signals detected by the sensor devices are then fed to the signal processing device 100 belonging to the central computer unit 1 and high-frequency noise portions are filtered out here with the aid of the low-pass filters 35–38, after which the oscillation representing the speed output signal is converted via Schmitt triggers 39–42 into a square wave signal of single pulses.

These single pulses from the speed output signals of the individual wheels then travel to the time control devices 43 to 46 (timers) which, for several successive and defined wheel rotation angles, measure the corresponding times for the partial rotations of the wheel determined by the defined wheel rotation angles, with the times being measured by ascertaining the time differences (zero value times) between two decreasing or increasing edges of the square wave signal that correlate with the times for the partial rotations.

Parallel to this, the single pulses of the square wave signal are fed to the counting devices 43' to 46' for ascertaining the number n ($T_L$) of the single pulses obtained or the times measured within a defined count time $T_L$.

The numbers of the obtained single pulses of several successive count times, here the numbers n $(T_L)_{FL(i)}$, n $(T_L)_{FR(i)}$, n $(T_L)_{RL(i)}$, and n $(T_L)_{RR(i)}$, of 10 successive count times (i=1–10) of the respectively processed speed output signals of the individual wheels, as well as the times ascertained for the partial rotations of the wheel determined by the defined wheel rotation angles, are then read into the storage device 47 and further processed by a downstream computer circuit 48, in which the average wheel rotation velocities V $(T_L)_{FL(i)}$, V $(T_L)_{FR(i)}$, V $(T_L)_{RL(i)}$, and V $(T_L)_{RR(i)}$ within the count times $T_L$ are calculated for one or more wheel rotations from the times ascertained for the partial rotations and their numbers within the count times $T_L$ and optionally stored.

The averaged wheel rotation velocities are then compared in a comparator 49 with reference and/or threshold values, such that, if a stipulated difference from the reference and/or threshold values is exceeded, the comparator transmits a signal to the display device 10 arranged in the instrument panel in the driver's field of view.

The central computer unit 1 also contains devices, not shown here in detail, for power supply and transmission, optionally for signal amplification and signal transmission, cooling devices, etc., as are typically and/or conventionally present and necessary in such units, also called microcomputers.

Figure 9:
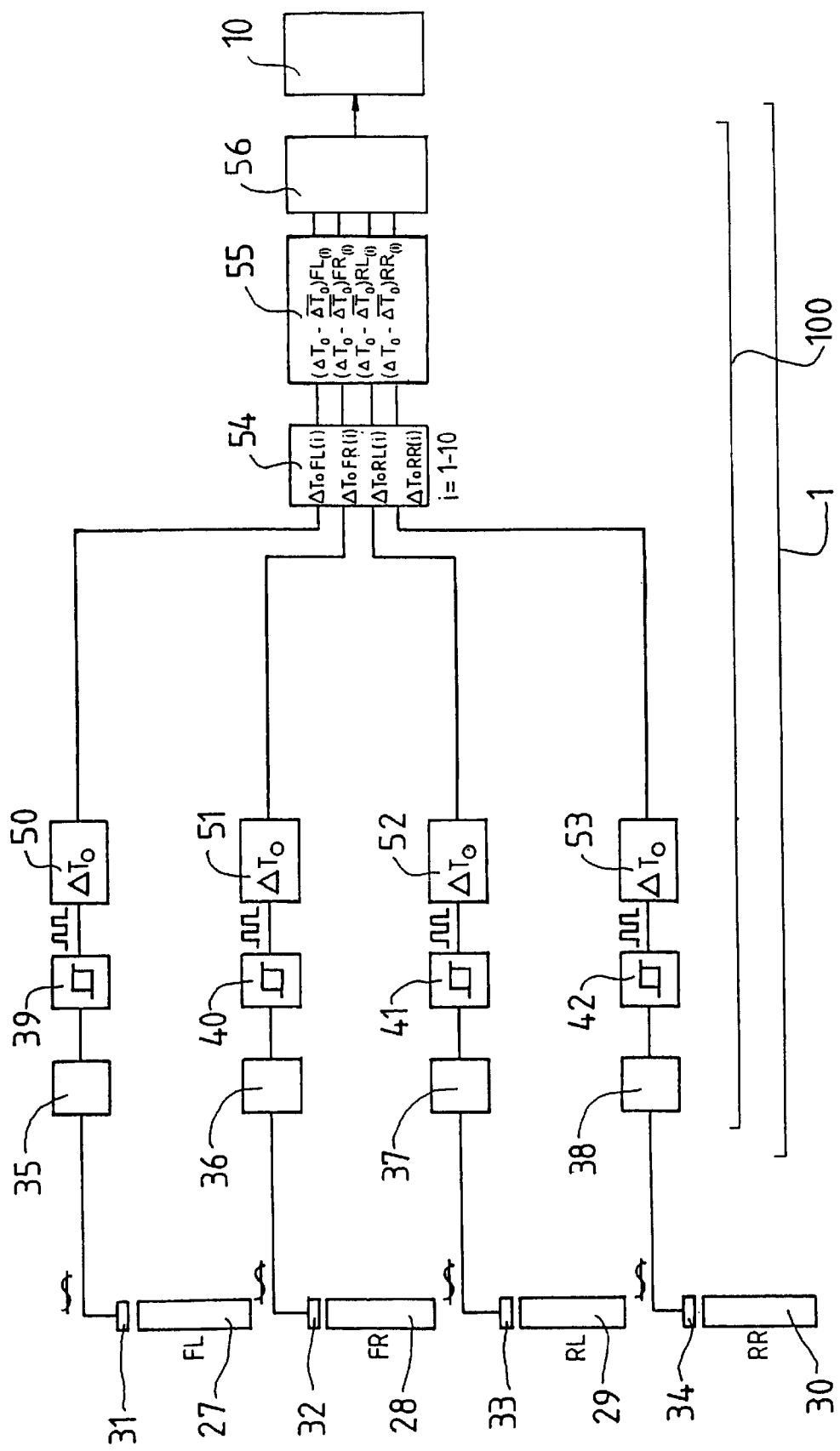
FIG. 9 shows a schematic representation of a signal processing of a device of the invention as a flow diagram, which signal processing is based on the evaluation according to the method, of the zero value times $\Delta T_{0(i)}$ (t)
Figure 10:
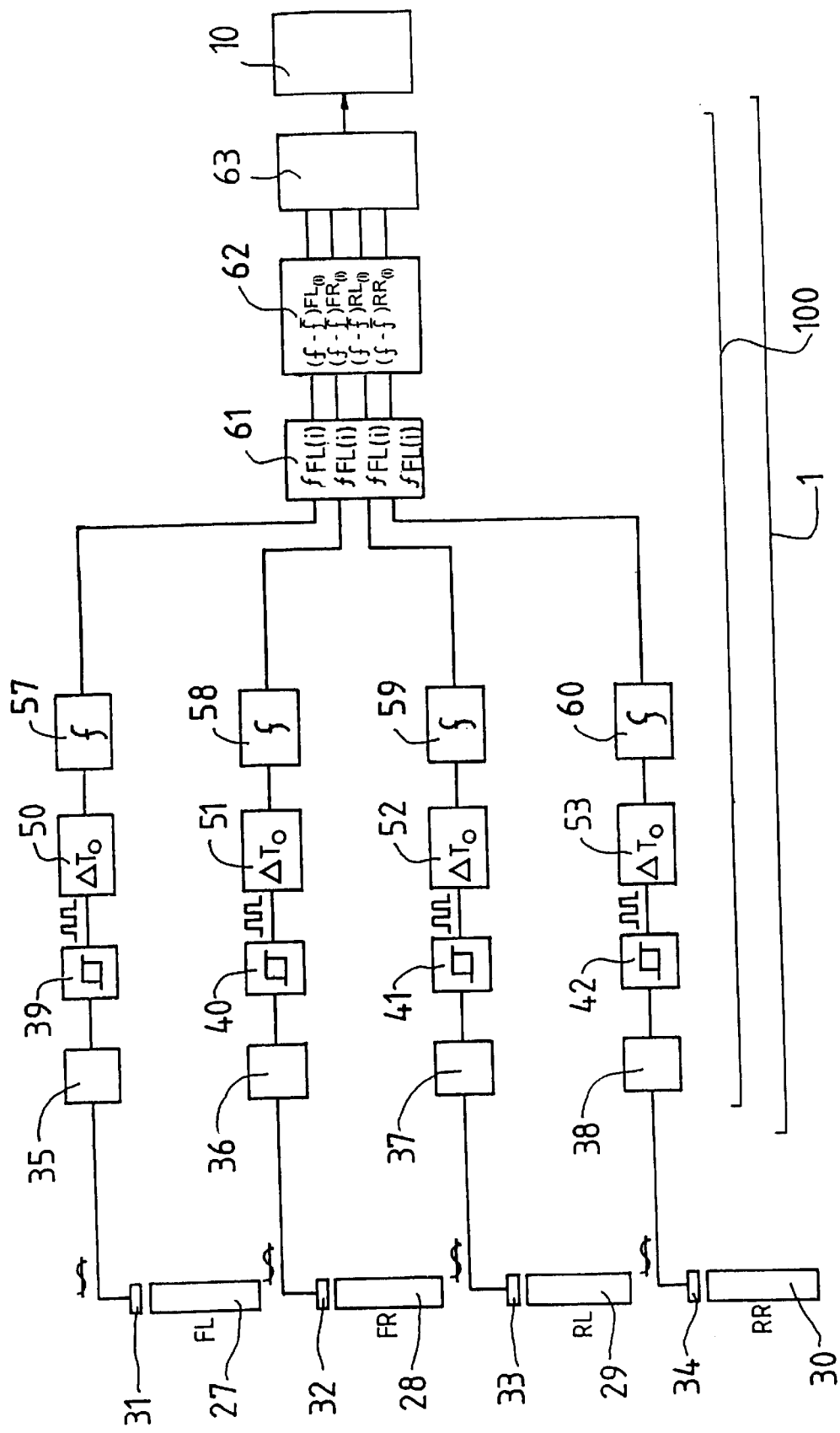
FIG. 10 shows a schematic representation of the signal processing of a device of the invention as a flow diagram, in which the frequencies of several successive measurements of the zero value times are calculated by taking the reciprocal.

The time control devices 43 to 46, as well as the counting devices 43' to 46', like the time control devices (timers) shown, for instance, in FIGS. 9 and 10, can also be designed as a "multiplex" device which, at brief time intervals, successively processes the individual speed output signals of the axles or wheels.

FIG. 9 shows a schematic representation of a signal processing based on the evaluation according to the method of the zero value times $\Delta T_{0(i)}$ (t) of a device according to the invention as a flow diagram, in which the times for partial rotations of the wheel are measured directly via the time differences between the zero values (zero value times), i.e., the time intervals $\Delta T_{0(i)}$ (t) between the edges of a square wave oscillation, with $\Delta T_0$ representing the zero value time for the determinations/measurements i, i+1, i+2, etc.

Schematically represented here again are first the sensor devices arranged on the individual wheels front left (FL), front right (FR), rear left (RL), and rear right (RR), which devices includes the active transmitter devices 27–30 designed as magnet wheels according to FIG. 2a and the magnetic field sensors 31–34 respectively assigned thereto.

As in the signal processing shown in FIG. 8, here as well, the speed output signals detected by the sensor device are then fed to the signal processing device 100 belonging to the central computer unit 1 and high-frequency noise portions are filtered out here with the aid of the low-pass filters 35–38, after which the oscillation representing the speed output signal is converted via Schmitt triggers 39–42 into a square wave signal of single pulses.

The single pulses thus obtained from the speed output signals of the individual wheels then travel to the time control devices 50 to 53 (timers) which, for several successive and defined wheel rotation angles, measure the corresponding times for the partial rotations of the wheel determined by the defined wheel rotation angles, with the times being measured by ascertaining the time differences $\Delta T_{0(i)}$ (t) between two decreasing or increasing edges of the square wave signal that correlate with the times for the partial rotations (zero value times).

The zero value times $\Delta T_{0FL(i)}$, $\Delta T_{0FR(i)}$, $\Delta T_{0RL(i)}$, and $\Delta T_{0RR(i)}$ of several successive time measurements of the processed speed output signals of the individual wheels are stored in a downstream storage device 54, with 10 successive time measurements (i=10) being stored here at a time.

In a subsequent computer circuit 55, the deviations of the times for the partial rotations of the wheel from the average values of the times for the partial rotations of the wheel calculated here for one or more wheel rotations or of the zero value times of several successive measurements are ascertained and fed to a comparator 56, which compares the ascertained deviations with reference and/or threshold values and if a stipulated difference from the reference and/or threshold values is exceeded, sends a warning signal to the warning device 10, which is again arranged in the instrument panel in the driver's field of view.

FIG. 10 shows a schematic representation of the signal processing of a device of the invention as a flow diagram in which the frequencies of several successive measurements of the zero value times are found from a reciprocal calculation.

Schematically represented here again are first the sensor devices arranged on the individual wheels front left (FL), front right (FR), rear left (RL), and rear right (RR), which devices includes the transmitter devices 27–30 designed as magnet wheels according to FIG. 2a and the magnetic field sensors 31–34 respectively assigned thereto.

The speed output signals detected by the sensor devices are then fed to the signal processing device 100 belonging to the central computer unit 1 and high-frequency noise portions are filtered out here with the aid of the low-pass filters 35–38, after which the oscillation representing the speed output signal is converted via Schmitt triggers 39–42 into a square wave signal of single pulses.

The single pulses thus obtained from the speed output signals of the individual wheels then travel to the time control devices 50 to 53 (timers) which, for several successive and defined wheel rotation angles, measure the corresponding times for the partial rotations of the wheel determined by the defined wheel rotation angles, with the times being measured by ascertaining the time differences $\Delta T_{0(i)}$ (t) between two decreasing or increasing edges of the square wave signal that correlate with the times for the partial rotations (zero value times).

These zero value times are then fed to the computer units 57–60, in which the frequencies of the zero value times are found from a reciprocal calculation in accordance with the formula $f_{(i)}(t)=0.5/\Delta T_{0(i)}(t)$, where $f_{(i)}(t)$ is the ascertained frequency and $\Delta T_{0(i)}(t)$ represents the zero value time for the determinations/measurements i, i+1, i+2, etc. The factor 0.5 results in this case from the 2 measured zero value times in an oscillation period of the speed output signal of a wheel which, in this case, is sine-shaped.

The frequencies $f_{FL(i)}$, $f_{FR(i)}$, $f_{RL(i)}$, and $f_{RR(i)}$ of several successive corresponding processing of the speed output signals of the individual wheels, ascertained from the zero value times, are stored in a downstream storage device 61, where 10 successive frequency determinations (i=10) are stored at a time.

In a subsequent computer circuit 62, the deviations of the frequencies from the average values, calculated here for one or more wheel rotations, of the frequencies for several successive frequency measurements are calculated and fed to a comparator 63, which compares the ascertained deviations with reference and/or threshold values and if a stipulated difference from the reference and/or threshold values is exceeded, sends a warning signal to the warning device 10 arranged in the driver's field of view.

Figure 11:
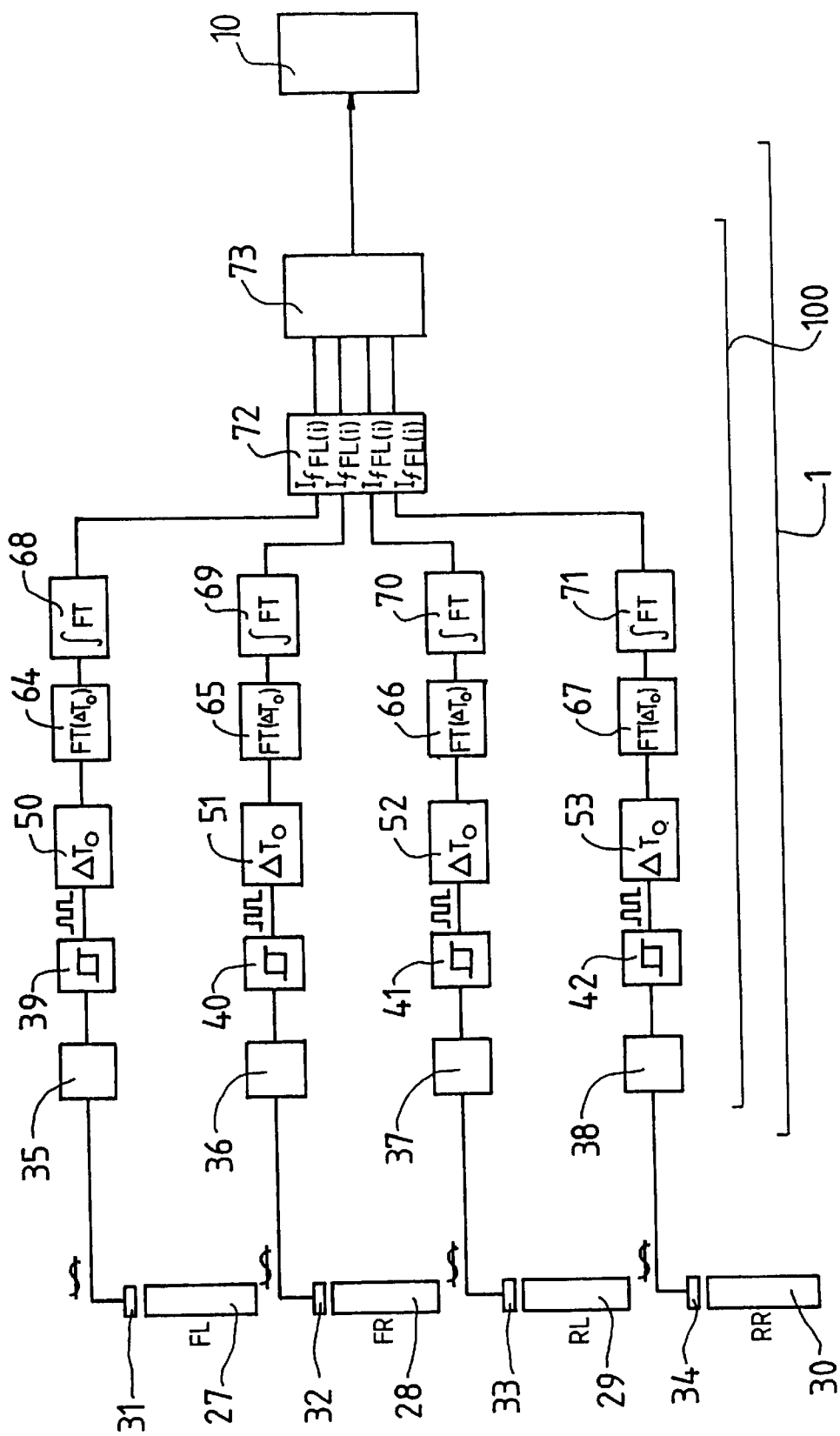
FIG. 11 shows a schematic representation of the signal processing of a device of the invention as a flow diagram, in which, with the aid of a computer unit, the frequency spectrum of the zero value times as a function of the time (time signal) undergoes a frequency analysis for ascertaining the power spectral density.

FIG. 11 shows a schematic representation of the signal processing of a device of the invention as a flow diagram in which, with the aid of a computer unit, the frequency spectrum of the zero value times as a function of the time (zero value time signal) undergoes a frequency analysis to ascertain the power spectral density.

Schematically represented here again are first the sensor devices arranged on the individual wheels front left (FL), front right (FR), rear left (RL), and rear right (RR), which devices includes the transmitter devices 27–30 designed as magnet wheels according to FIG. 2a and the magnetic field sensors 31–34 respectively assigned thereto.

The speed output signals detected by the sensor devices are then fed to the signal processing device 100 belonging to the central computer unit 1 and high-frequency noise portions are filtered out here with the aid of the low-pass filters 35–38, after which the oscillation representing the speed output signal is converted via Schmitt triggers 39–42 into a square wave signal of single pulses.

The single pulses thus obtained from the speed output signals of the individual wheels then travel to the time control devices 50 to 53 (timers) which, for several successive and defined wheel rotation angles, measure the corresponding times for the partial rotations of the wheel determined by the defined wheel rotation angles, with the times being measured by ascertaining the time differences $\Delta T_{0(i)}$ (t) between two decreasing or increasing edges of the square wave signal that correlate with the times for the partial rotations (zero value times).

The frequency spectrum of this zero value time signal is then fed to the computer units 64–67, in which a frequency analysis FT ($\Delta T_0$) is carried out in the form of a Fourier transform to ascertain the power spectral density.

Then the power spectral densities of the correspondingly processed respective speed output signals of the individual wheels are integrated over certain frequency ranges in the computer units 68–71, such that a value for the expression $$\int FT(\Delta T_0)df = I_{f(i)}$$

is found for the integral. The integrals $I_{fFL(i)}$, $I_{fFR(i)}$, $I_{fRL(i)}$ and $I_{fRR(i)}$ thus ascertained for the respective speed output signals of the individual wheels are then first fed to a storage device 72 and then to a comparator 73, which compares the ascertained integrals with reference and/or threshold values and if a stipulated difference from the reference and/or threshold values is exceeded, sends a warning signal to the warning device 10 arranged in the driver's field of view.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

List of Reference Numbers

1 Central computer unit
2–5 Sensor devices
6–9 Wheels
10 Display or warning device
11 Magnet wheel
12 Magnetic field sensor
13 Toothed wheel
14 Magnetic field sensor
15 Tire sidewall
16 Permanent-magnet areas
17 Magnetic field sensor
18 Rim
19 Emergency running support element
20 Tire
21 Concavities
22 Inside of the tire
23 Emergency running surface of the emergency running support element
24 Time interval
27–30 Magnet wheels
31–34 Magnetic field sensors
35–38 Low-pass filters
39–42 Schmitt triggers
43–46 Time control devices
43'–46' Counting devices
47 Storage device
48 Computer circuit
49 Comparator
50–53 Time control devices (timers)
54 Storage device
55 Computer circuit
56 Comparator
57–60 Computer unit for determining frequency from a reciprocal calculation
61 Storage device 62 Computer circuit
63 Comparator
64–67 Computer unit for performing a Fourier transform
68–71 Computer unit for performing an integration
72 Storage device
73 Comparator
100 Signal processing device
200 Velocity curve
201, 202 Reference or threshold values
203 Time behavior of the normal speed output signal
204 Time behavior of the superimposed speed output signal
205 Zero value time signal of the normal speed output signal
206 Zero value time signal of the superimposed speed output signal
207 Frequencies of the zero value times of the normal speed output signal
208 Frequencies of the zero value times of the superimposed speed output signal
209 Wheel velocities ascertained from the normal speed output signal
209'–209''' Wheel velocities ascertained from the normal speed output signal under actual vehicle operation
210 Wheel velocities ascertained from the superimposed speed output signal
210' Wheel velocities ascertained from the superimposed speed output signal under actual vehicle operation in the emergency running condition
211 Wheel accelerations ascertained from the wheel velocities of the normal speed output signal
212 Wheel accelerations ascertained from the wheel velocities of the superimposed speed output signal
213 Wheel accelerations 212 filtered by averaging
214 Power spectral density (normal speed output signal)
215 Power spectral density (superimposed speed output signal)

What is claimed is:

1. A method for ascertaining the emergency running condition of a pneumatic tire on a motor vehicle, the method comprising:
   producing a permanently present first periodic oscillation in at least each axle proportional to a wheel rotation speed as a speed output signal;
   feeding the speed output signal to a signal processing device,
   wherein in an emergency running condition, the process further comprises:
      superimposing, on one of the first periodic oscillation and the speed output signal, at least one separately defined periodic oscillation related to the emergency running condition and proportional to an emergency running condition wheel rotation speed;
      detecting the superimposition of the first periodic oscillation with the at least one separately defined periodic oscillation characteristic of the emergency running condition in the signal processing device; and
      producing a warning signal.

2. The method of claim 1, wherein the speed output signal is produced using one of an active and a passive magnetic field sensor.

3. The method of claim 2, wherein the magnetic field sensor comprises an encoder.

4. The method of claim 2, wherein the magnetic field sensor comprises a rotating member a stationary member, the magnetic field sensor being situated on a part of the vehicle.

5. The method of claim 4, wherein the magnetic field sensor is positioned on a part of the vehicle which is either stationary or rotates with the wheel, the magnetic field sensor producing a periodic magnetic field change in proportion to the wheel rotation speed.

6. The method of claim 1, wherein the at least one separately defined periodic oscillation is produced by an emergency running device provided on the at least one wheel, the at least one separately defined periodic oscillation being produced when the wheel experiences one of damaged and a loss of air pressure.

7. The method of claim 6, wherein the at least one separately defined periodic oscillation is produced by an emergency running support element which is arranged inside a pneumatic tire and on a rim of the wheel, the emergency running support element comprising a rolling circumference with discontinuities.

8. The method of claim 7, wherein the discontinuities comprise one of cavities and concavities.

9. The method of claim 6, wherein the at least one separately defined periodic oscillation is produced as a result of at least one material reinforcement formed inside a tire body of the wheel.

10. The method of claim 9, wherein the at least one material reinforcement is arranged in a sidewall region of the tire body, the at least one material reinforcement comprising one of various layers and plies of strength supports which stabilize the tire body in the emergency running condition when the tire experiences damage or a loss of air pressure, the at least one material reinforcement having defined discontinuities distributed over a circumference region.

11. The method of claim 10, wherein the discontinuities comprise one of agglomerations of material and material voids.

12. The method of claim 9, wherein the at least one separately defined periodic oscillation is produced by a first number of discontinuities distributed uniformly over a circumference of the tire body.

13. The method of claim 9, wherein the at least one separately defined periodic oscillation is produced by each of a first number of discontinuities distributed uniformly over a circumference of the tire body and a second number of discontinuities, different from the first number, which are distributed uniformly over the circumference of the tire body.

14. The method of claim 1, further comprising comparing the speed output signal, after being processed in the signal processing device, with at least one reference and threshold value.

15. The method of claim 14, further comprising recognizing when the at least one reference or threshold value is exceeded and producing the warning signal when the reference or threshold value is exceeded.

16. The method of claim 14, wherein the comparing comprises comparing the speed output signal with a speed output signal of at least one other wheel, the at least one other wheel representing the at least one reference or threshold value.

17. The method of claim 8, wherein, in the signal processing device, the process further comprises:
   calculating a wheel velocity for a stipulated time interval from the speed output signal;
   comparing the wheel velocity with one of at least one reference wheel velocity and at least one threshold value, wherein the speed output signal is represented with an oscillation, and the process further comprises:
      ascertaining and storing for several successive and defined wheel rotation angles, corresponding times for partial rotations of the wheel determined by the defined wheel rotation angles;

within defined count times $T_L$ containing several successive wheel rotation angles, calculating and storing an average wheel rotation velocity for at least one wheel rotation within the count times from the times ascertained for the partial rotations; and comparing one of average wheel rotation velocities and their course with the at least one reference wheel velocity or the at least one threshold value, wherein, when the at least one reference wheel velocity or the at least one threshold value is exceeded by the average wheel rotation velocity or the their coarse, a warning signal is activated.

18. The method of claim 8, wherein, in the signal processing device, the process further comprises:

ascertaining and storing for several successive and defined wheel rotation angles, corresponding times for partial rotations of the wheel determined by the defined wheel rotation angles;

calculating and storing an average from several such successively ascertained times for at least one wheel rotation;

ascertaining deviations between the ascertained and stored times and the calculated and stored average; and comparing the ascertained deviations with one of at least one reference value and at least one threshold value, wherein, when the at least one reference value or the at least one threshold value is exceeded by the ascertained deviations, a warning signal is activated.

19. The method of claim 8, wherein, in the signal processing device, the process further comprises:

ascertaining and storing for several successive and defined wheel rotation angles, corresponding times for partial rotations of the wheel determined by the defined wheel rotation angles;

ascertaining a pattern of the corresponding times for partial rotations of the wheel using a pattern recognition process; and comparing the ascertained pattern with one of a reference pattern and at least one threshold value, wherein, when the ascertained pattern deviates from the reference pattern or the at least one threshold value, a warning signal is activated.

20. The method of claim 8, wherein, in the signal processing device, the process further comprises:

ascertaining and storing for several successive and defined wheel rotation angles, corresponding times for partial rotations of the wheel determined by the defined wheel rotation angles;

ascertaining and storing frequencies for the corresponding times for partial rotations of the wheel with the aid of at least one computer unit;

calculating and storing reciprocals of the frequencies;

calculating and storing averages of the frequencies; and ascertaining and storing deviations between the reciprocals and the averages;

comparing the deviations with one of at least one reference value and at least one threshold value, wherein, when the at least one reference value or the at least one threshold value is exceeded by the deviations, a warning signal is activated.

21. The method of claim 8, wherein, in the signal processing device, the process further comprises:

ascertaining and storing for several successive and defined wheel rotation angles, corresponding times for partial rotations of the wheel determined by the defined wheel rotation angles;

ascertaining and storing a frequency spectrum of the corresponding times for partial rotations of the wheel with the aid of at least one computer unit;

ascertaining power spectral densities by performing a frequency analysis on the frequency spectrum;

integrating and storing the power spectral densities over certain selected frequency intervals with the aid of at least one computer unit; and comparing the integrated power spectral densities with one of at least one reference value and at least one threshold value, wherein, when the at least one reference value or the at least one threshold value is exceeded by the integrated power spectral densities, a warning signal is activated.

22. The method of claim 8, wherein, in the signal processing device, the process further comprises:

ascertaining and storing for several successive and defined wheel rotation angles, corresponding times for partial rotations of the wheel determined by the defined wheel rotation angles;

calculating and storing momentary wheel velocities from the corresponding times for the partial rotations of the wheel with the aid of at least one computer unit;

calculating and storing averages from the momentary wheel velocities;

ascertaining and storing deviations between the momentary wheel velocities and the averages; and comparing the deviations with one of at least one reference value and at least one threshold value, wherein, when the at least one reference value or the at least one threshold value is exceeded by the deviations, a warning signal is activated.

23. The method of claim 8, wherein, in the signal processing device, the process further comprises:

ascertaining and storing for several successive and defined wheel rotation angles, corresponding times for partial rotations of the wheel determined by the defined wheel rotation angles;

calculating and storing momentary wheel accelerations from the corresponding times for partial rotations of the wheel with the aid of at least one computer unit;

calculating and storing averages of the momentary wheel accelerations;

ascertaining deviations between the momentary wheel accelerations and one of the averages and a zero value; and comparing the deviations with one of at least one reference value and at least one threshold value, wherein, when the at least one reference value or the at least one threshold value is exceeded by the deviations, a warning signal is activated.

24. The method of claim 23, wherein the deviations are ascertained between the momentary wheel accelerations and zero values, the deviations being represented as time differences between the zero values which are measured in one of at least one time control device and at least one timer.

25. The method of claim 24, wherein the time differences undergo a rotation-synchronous averaging before being further processed, such that an average is obtained over several wheel rotations from the zero value times measured with respect to one wheel rotation at equal time intervals or at equal rotation angle intervals, which average is then a basis for further signal processing.

26. A system for ascertaining the emergency running condition of a pneumatic tire on a motor vehicle, the system comprising:
  at least one sensor device arranged at least on each axle, the at least one sensor device adapted to supply a permanently present first periodic oscillation proportional to a wheel rotation speed as a speed output signal;
  the at least one sensor device comprising one of an active and a passive magnetic field sensor being mounted to one of rotate with the tire and be stationary;
  the at least one sensor device further comprising one of a magnetically active and passive transmitter device which rotates at the wheel rotation speed relative to a magnetic field sensor, the transmitter device being arranged complementary to the at least one passive and active magnetic field sensor and adapted to produce a periodic magnetic field change in proportion to the wheel rotation speed in a detection range;
  at least one signal processing device for processing and evaluating the speed output signal, the signal processing device being adapted to produce one of an output control and a warning signal;
  a transmission and a display device for at least one of the transmission and the display of the speed output signal, and for one of the transmission and the display of at least one of the output control and the warning signal; and
  an emergency running device arranged on the vehicle wheel which, in an emergency running condition, is adapted to produce at least one separately defined periodic oscillation related to the emergency running condition and proportional to the emergency running condition wheel rotation speed,
  wherein, in an emergency running condition, the at least one separately defined periodic oscillation is superimposed on one of the first periodic oscillation and or the speed output signal.

27. The system of claim 26, wherein the at least one signal processing device comprises at least one filtering device for filtering noise.

28. The system of claim 27, wherein the at least one signal processing device comprises at least one storage device for storing one of reference and threshold values.

29. The system of claim 28, wherein the at least one signal processing device comprises a comparator which, after processing, compares a respective speed output signal with one of at least one reference value and at least one threshold value, and detects a superimposition of the first periodic oscillation with the at least one separately defined periodic oscillation, such that when the reference value or the threshold value is exceeded, a warning signal is produced.

30. The system of claim 26, wherein the emergency running device comprises at least one emergency running support element arranged inside a tire of the wheel.

31. The system of claim 30, wherein the at least one emergency running support element is supported on a rim of the wheel and comprises an emergency running surface having a circumference and a plurality of defined discontinuities distributed over the circumference.

32. The system of claim 31, wherein the discontinuities comprise one of cavities and concavities.

33. The system of claim 26, wherein the emergency running device comprises at least one material reinforcement formed inside a tire body of the wheel.

34. The system of claim 33, wherein the at least one material reinforcement is arranged in a sidewall region of the tire body.

35. The system of claim 34, wherein the at least one material reinforcement has a plurality of defined discontinuities distributed over a circumference portion of the tire body and comprises one of various layers and plies of strength supports, such that the at least one material reinforcement is adapted to stabilize the tire in the emergency running condition.

36. The system of claim 35, wherein the defined discontinuities comprise one of material agglomerations and material voids.

37. The system of claim 31, wherein the defined discontinuities are distributed uniformly over the circumference.

38. The system of claim 31, wherein the defined discontinuities comprise a first number of discontinuities distributed uniformly over the circumference and a second number of discontinuities, different from the first number, distributed uniformly over the circumference.

39. The system of claim 26, wherein the speed output signal is an input signal for the signal processing device and the signal processing device further comprises:
  one of at least one filter and at least one low-pass filter for filtering out high-frequency noise portions of the speed output signal;
  one of at least one comparator circuit and at least one Schmitt trigger for converting the speed output signal into a single-pulse square wave signal;
  one of at least one time control device and at least one timer which, for several successive and defined wheel rotation angles, measures corresponding times for partial rotations of the wheel determined by the defined wheel rotation angles, with the times being measured by ascertaining time differences between two decreasing or increasing edges of the square wave signal that correlate with the times for the partial rotations;
  at least one counting device connected in parallel to one of the at least one time control device and the at least one timer and receiving the single-pulse signal, the at least one counting device ascertaining one of the number of single pulses obtained and measured times within a defined count time $T_L$;
  at least one storage devices for storing the measured corresponding times for partial rotations of the wheel and the number of single pulses obtained within several successive count times $T_L$;
  a computer circuit for calculating and storing a average wheel rotation velocity within the count times $T_L$ for at least one wheel rotation from the times ascertained for the partial rotations and their numbers within the count times $T_L$; and
  a comparator for comparing one of the average wheel rotation velocity or their course with one of at least one reference value and at least one threshold value,
  wherein, when the at least one reference value or the at least one threshold value is exceeded by the averaged wheel rotation velocity or their coarse, a warning signal is activated.

40. The system of claim 26, wherein the speed output signal is an input signal for the signal processing device and the signal processing device further comprises:
  one of at least one filter and at least one low-pass filter for filtering out high-frequency noise portions of the speed output signal;
  one of at least one comparator circuit and at least one Schmitt trigger for converting the speed output signal into a single-pulse square wave signal;

one of at least one time control device and at least one timer which, for several successive and defined wheel rotation angles, measures corresponding times for partial rotations of the wheel determined by the defined wheel rotation angles, with the times being measured by ascertaining time differences between two decreasing or increasing edges of the square wave signal that correlate with the times for the partial rotations;

at least one storage device for storing the measured corresponding times for partial rotations of the wheel;

a computer circuit for calculating an average value from the measures corresponding times for partial rotations of the wheel and for calculating deviations of the measures corresponding times for partial rotations of the wheel from the average value; and a comparator for comparing the deviations with one of at least one reference value and at least one threshold value, wherein, when the at least one reference value or the at least one threshold value is exceeded by the deviations, a warning signal is activated.

41. The system of claim 26, wherein the speed output signal is an input signal for the signal processing device and the signal processing device further comprises:

one of at least one filter and at least one low-pass filter for filtering out high-frequency noise portions of the speed output signal;

one of at least one comparator circuit and at least one Schmitt trigger for converting the speed output signal into a single-pulse square wave signal;

one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations;

at least one computer unit for calculating frequencies of the measured corresponding times for partial rotations of the wheel and taking the reciporocal of the frequencies;

at least one storage device for storing the calculated frequencies;

a computer circuit for calculating an average value of several successively calculated frequencies and for calculating deviations of the calculated frequencies from the average value; and a comparator for comparing the deviations with one of at least one reference value and at least one threshold value, wherein when the at least one reference value or the at least one threshold value is exceeded by the deviations, a warning signal is activated.

42. The system of claim 26, wherein the speed output signal is an input signal for the signal processing device and the signal processing device further comprises:

one of at least one filter and at least one low-pass filter for filtering out high-frequency noise portions of the speed output signal;

one of at least one comparator circuit and at least one Schmitt trigger for converting the speed output signal into a single-pulse square wave signal;

one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations;

at least one computer unit for carrying out a frequency analysis of a frequency spectrum of the measured corresponding times for partial rotations of the wheel as a function of a time or time signal and for ascertaining power spectral densities;

at least one computer unit for integrating the power spectral densities ascertained over certain selected frequency intervals;

at least one storage device for storing several successively ascertained integrals; and a comparator for comparing the ascertained integrals with one of at least one reference value and at least one threshold value, wherein, when the at least one reference value or the at least one threshold value is exceeded by the ascertained integrals, a warning signal is activated.

43. The system of claim 26, wherein the speed output signal is an input signal for the signal processing device and the signal processing device further comprises:

one of at least one filter and at least one low-pass filter for filtering out high-frequency noise portions of the speed output signal;

one of at least one comparator circuit and at least one Schmitt trigger for converting the speed output signal into a single-pulse square wave signal;

one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations;

a computer circuit for calculating momentary wheel velocities of the measured corresponding times for partial rotations of the wheel;

at least one storage device for storing calculated momentary wheel velocities;

a computer circuit for calculating an average value of the momentary wheel velocities and for calculating deviations of the momentary wheel velocities from the average value; and a comparator for comparing the deviations with one of at least one reference value and at least one threshold value, wherein, when the at least one reference value or the at least one threshold value is exceeded by the deviations, a warning signal is activated.

44. The system of claim 26, wherein the speed output signal is an input signal for the signal processing device and the signal processing device further comprises:

one of at least one filter and at least one low-pass filter for filtering out high-frequency noise portions of the speed output signal;

one of at least one comparator circuit and at least one Schmitt trigger for converting the speed output signal into a single-pulse square wave signal;

one of at least one time control device and at least one timer which, for several successive and defined wheel rotation angles, measure corresponding times for partial rotations of the wheel determined by the defined wheel rotation angles, with the times being measured by ascertaining time differences between two decreasing or increasing edges of the square wave signal that correlate with the times for the partial rotations;

a computer circuit for calculating momentary wheel accelerations of the measured corresponding times for partial rotations of the wheel;

at least one storage device for storing calculated momentary wheel accelerations;

a computer circuit for calculating an average value of the momentary wheel accelerations and for calculating deviations of the momentary wheel accelerations from the average value; and a comparator for comparing the deviations with one of at least one reference value and at least one threshold value, wherein, when the at least one reference value or the at least one threshold value is exceeded by the deviations, a warning signal is activated.

45. The system of claim 26, wherein the speed output signal is fed from some portion of an anti-locking braking system.

46. The system of claim 26, wherein an anti-locking braking system is coupled to the signal processing device.

47. A method for ascertaining an emergency running condition of a pneumatic tire on a motor vehicle, the method comprising:

sensing a permanently present first periodic oscillation proportional to a wheel rotation speed of at least one wheel of the motor vehicle, the at least one wheel comprising an emergency running device which produces at least one periodic oscillation characteristic of an emergency running condition when the wheel experiences substantial damage or a substantial loss of air pressure, the sensing being performed by at least one sensor device disposed adjacent the at least one wheel;

feeding a speed output signal from the at least one sensor device to at least one filter which filters out high-frequency noise portions of the speed output signal;

converting the speed output signal into a square wave signal of single pulses using one of at least comparator circuit and at least one Schmitt trigger;

processing the single pulses using at least one processing device and producing at least one output;

storing the at least one output in a storage device;

subjecting the at least one output to a calculation with a computer circuit to produce at least one value;

comparing the at least one value with one of at least one reference value and at least one threshold value using a comparator; and producing at least one warning signal on a display device when the at least one value exceeds the at least one reference value or the at least one threshold value, wherein the at least one warning signal is produced when the tire experiences the emergency running condition.

48. The method of claim 47, wherein the processing is performed by two processing devices, one processing device comprising a time control device and the other processing device comprising a counting device.

49. The method of claim 47, wherein the processing is performed by the at least one processing device which comprising a time control device.

50. The method of claim 47, wherein the processing is performed by two processing devices, one processing device comprising a time control device and the other processing device comprising a computer which utilizes a formula.

51. A method for ascertaining an emergency running condition of a pneumatic tire on a motor vehicle, the method comprising:

sensing a permanently present first periodic oscillation proportional to a wheel rotation speed of at least one wheel of the motor vehicle, the at least one wheel comprising an emergency running device which produces at least one periodic oscillation characteristic of an emergency running condition when the wheel experiences substantial damage or a substantial loss of air pressure, the sensing being performed by at least one sensor device disposed adjacent the at least one wheel;

feeding a speed output signal from the at least one sensor device to at least one filter which filters out high-frequency noise portions of the speed output signal;

converting the speed output signal into a square wave signal of single pulses using one of at least one comparator circuit and at least one Schmitt trigger;

processing the single pulses using one of at least one time control device and at least one timer and producing a frequency spectrum;

feeding the frequency spectrum to a computer and performing a frequency analysis using a Fourier transform to ascertain power spectral densities;

integrating the power spectral densities using a computer and an integral so as to produce ascertained integrals;

feeding the ascertained integrals to at least one a storage device;

comparing the ascertained integrals with one of at least one reference value and at least one threshold value using a comparator; and producing at least one warning signal on a display device when the ascertained integrals exceed the at least one reference value or the at least one threshold value, wherein the at least one warning signal is produced when the tire experiences the emergency running condition.

52. A system for ascertaining an emergency running condition of a pneumatic tire on a motor vehicle, the system comprising:

a plurality of wheel sensor devices disposed on the vehicle, each wheel sensor device comprising:

one of an active or passive magnetic field sensor being disposed adjacent each wheel of the vehicle, each wheel sensor device supplying a permanently present first periodic oscillation in proportion to a wheel rotation speed in the form of a speed output signal;

a signal processing device receiving the speed output signal, the signal processing device comprising:

a plurality of low-pass filters for filtering out high-frequency noise portions of the speed output signal;

a Schmitt trigger connected to each low-pass filter;

a time control device connected to each Schmitt trigger;

a storage device connected to the time control devices;

a computer circuit connected to the storage device;

a comparator connected to the computer circuit; and a display connected to the comparator, wherein the signal processing device processes and evaluates the speed output signal, the signal processing device being adapted to produce a warning signal on the display device when the wheel experiences the emergency running condition.

53. The system of claim 52, wherein the signal processing device further comprises a counting device connected to each Schmitt trigger and connected to the storage device.

54. The system of claim 52, wherein the signal processing device further comprises a computer using a formula connected to each Schmitt trigger and connected to the storage device.

55. The system of claim 52, further comprising an emergency running device disposed on each wheel.

56. The system of claim 55, wherein the emergency running device comprises at least one emergency running support element arranged inside a tire of the wheel.

57. The system of claim 56, wherein the emergency running support element is supported on a rim of the wheel and comprises an emergency running surface having a circumference and a plurality of defined discontinuities distributed over the circumference.

58. A system for ascertaining the emergency running condition of a pneumatic tire on a motor vehicle, the system comprising:
   a plurality of wheel sensor devices disposed on the vehicle, each wheel sensor device comprising:
      one of an active or passive magnetic field sensor being disposed adjacent each wheel of the vehicle, each wheel sensor device supplying a permanently present first periodic oscillation in proportion to a wheel rotation speed in the form of a speed output signal;
   a signal processing device receiving the speed output signal, the signal processing device comprising:
      a plurality of low-pass filters for filtering out high-frequency noise portions of the speed output signal;
      a Schmitt trigger connected to each low-pass filter;
      a time control device connected to each Schmitt trigger;
      a computer utilizing a Fourier transform connected to each time control devices;
      a computer utilizing an integral connected to the computer utilizing the Fourier transform;
      a storage device connected to the computer utilizing the integral;
      a comparator connected to the storage device; and
      a display connected to the comparator,
      wherein the signal processing device processes and evaluates the speed output signal, the signal processing device being adapted to produce a warning signal on the display device when the wheel experiences an emergency running condition.

59. The system of claim 58, further comprising an emergency running device disposed on each wheel.

60. The system of claim 59, wherein the emergency running device comprises at least one emergency running support element arranged inside a tire of the wheel.

61. The system of claim 60, wherein the emergency running support element is supported on a rim of the wheel and comprises an emergency running surface having a circumference and a plurality of defined discontinuities distributed over the circumference.

* * * * *